(12) United States Patent
Gum et al.

(10) Patent No.: US 12,704,905 B2
(45) Date of Patent: Aug. 11, 2026

(54) MULTI-MODE TWO-HAND GESTURE TRACKING

(71) Applicant: Apple Inc., Cupertino, CA (US)

(72) Inventors: Leah Gum, Sunol, CA (US); Chase B Lortie, San Francisco, CA (US); Julian K Shutzberg, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/654,378

(22) Filed: May 3, 2024

(65) Prior Publication Data

US 2024/0385693 A1 Nov. 21, 2024

Related U.S. Application Data

(60) Provisional application No. 63/613,092, filed on Dec. 21, 2023, provisional application No. 63/466,429, filed on May 15, 2023.

(51) Int. Cl.
*G06F 3/01* (2006.01)
*G06F 3/04815* (2022.01)

(52) U.S. Cl.
CPC .............. *G06F 3/017* (2013.01); *G06F 3/013* (2013.01); *G06F 3/04815* (2013.01)

(58) Field of Classification Search
CPC .......... G06F 3/011; G06F 3/013; G06F 3/017; G06F 3/04815; G06F 3/038; G06F 3/04847; G02B 27/0093; G02B 27/017
See application file for complete search history.

(56) References Cited

U.S. PATENT DOCUMENTS

| | | | | |
|---|---|---|---|---|
| 11,294,475 | B1 | 4/2022 | Pinchon et al. | |
| 2014/0351753 | A1 | 11/2014 | Shin et al. | |
| 2016/0284129 | A1* | 9/2016 | Nishizawa | G06F 3/013 |
| 2017/0038830 | A1* | 2/2017 | Clement | G06F 3/04847 |
| 2018/0046245 | A1* | 2/2018 | Schwarz | G02B 27/0093 |
| 2018/0322701 | A1* | 11/2018 | Pahud | G06F 3/038 |
| 2020/0225758 | A1 | 7/2020 | Tang et al. | |
| 2020/0225830 | A1* | 7/2020 | Tang | G06F 3/011 |
| 2020/0387229 | A1* | 12/2020 | Ravasz | G06F 3/017 |

(Continued)

FOREIGN PATENT DOCUMENTS

| | | |
|---|---|---|
| CN | 116540880 A | 8/2023 |
| DE | 102015201730 A1 | 8/2016 |

(Continued)

*Primary Examiner* — Richard J Hong
(74) *Attorney, Agent, or Firm* — Thompson Hine LLP

(57) ABSTRACT

Various implementations disclosed herein include devices, systems, and methods that interpret user activity involving both hands based on determining an interaction mode associated with each hand of a user. For example, a process may receive data corresponding to user activity involving two hands of a user in a 3-dimensional (3D) coordinate system. The process may further identify actions performed by the two hands based on the data corresponding to the user activity. Each of the two hands performs one of the identified actions. The process may further determine whether the identified actions satisfy a criterion based on the data corresponding to the user activity and in accordance, determine to associate each of the actions performed by each of the two hands with a direct interaction mode or an indirect interaction mode.

18 Claims, 8 Drawing Sheets

(56) References Cited

U.S. PATENT DOCUMENTS

2021/0089121 A1* 3/2021 Rönngren .......... G02B 27/0093
2021/0263593 A1 8/2021 Lacey
2022/0253199 A1* 8/2022 Tang .................... G02B 27/017
2022/0413691 A1* 12/2022 Becker ................ G06F 3/04815
2023/0038709 A1 2/2023 Ramani et al.
2023/0078183 A1 3/2023 Wang et al.
2023/0384928 A1 11/2023 Moll et al.

FOREIGN PATENT DOCUMENTS

DE 102016214391 A1 2/2018
JP 6651388 B2 2/2020

* cited by examiner

FIG. 7A
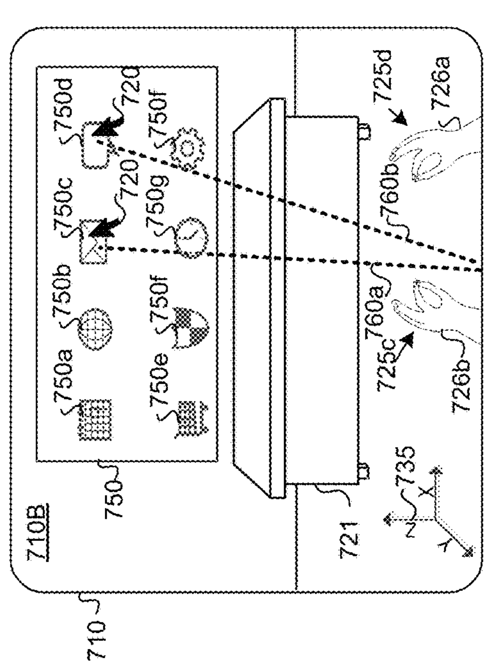
FIG. 7B
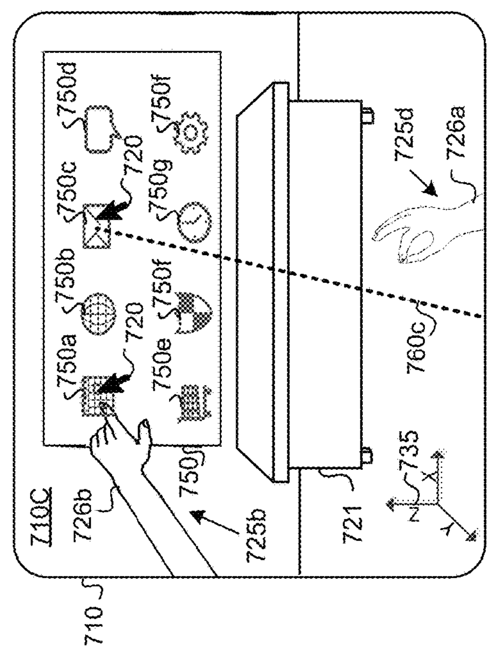
FIG. 7C
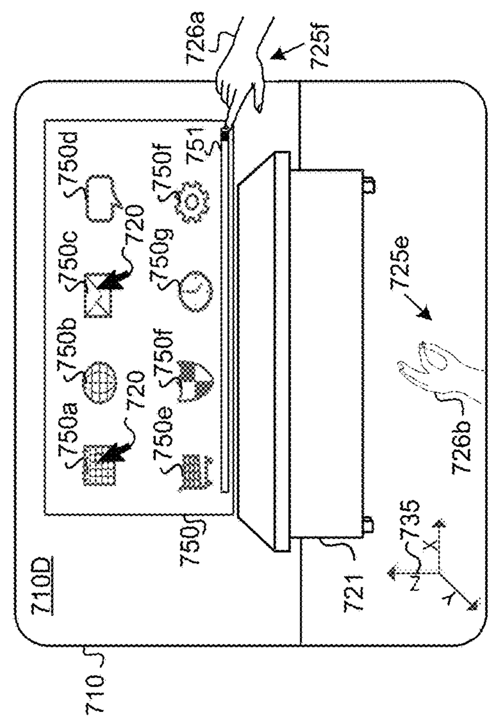
FIG. 7D

MULTI-MODE TWO-HAND GESTURE TRACKING

CROSS-REFERENCE TO RELATED APPLICATIONS

This Application claims the benefit of U.S. Provisional Application Ser. No. 63/466,429 filed May 15, 2023, and U.S. Provisional Application Ser. No. 63/613,092 filed Dec. 21, 2023, each which is incorporated by reference herein in its entirety.

TECHNICAL FIELD

The present disclosure generally relates to determining an interaction mode with respect to gestures associated with providing input commands for electronic devices.

BACKGROUND

Existing user interaction detection systems may be improved with respect to determining interaction types based on detected user activities.

SUMMARY

Various implementations disclosed herein include devices, systems, and methods that interpret user activity involving two hands of a user based on a determined interaction mode associated with each hand of the user. An interaction mode may be a direct interaction mode. For example, a direct interaction mode may be associated with a direct user interaction such as, inter alia, the user utilizing a finger to directly activate a virtual button of a user interface (UI) within an extended reality (XR) environment. Alternatively, an interaction mode may be an indirect interaction mode. For example, an indirect interaction mode may be associated with a user interaction such as, inter alia, the user gazing at a virtual button of a virtual UI and simultaneously performing a pinch gesture (e.g., fingers coming together and touching) to select the virtual button.

In some implementations, interactions including two hands of a user may be associated with a direct interaction mode. In some implementations, interactions including two hands of a user may be associated with an indirect interaction mode. In some implementations, interactions comprising two hands of a user may be associated with a combination of a direct interaction mode and an indirect interaction mode such that a first hand of the user is associated with a direct interaction mode and a second hand of the user is associated with an indirect interaction mode. For example, a first hand of the user located within a near field may be tied to direct UI controls while a second hand of the user is configured to select within a far field thereby combining direct interactions and indirect interactions. Combining direct interactions and indirect interactions may facilitate a combination of a large XR environment selection and fine XR environment selection. For example, a virtual slider (e.g., to modify a photo background color) may be interacted with via a direct control panel while a user interacts with additional UI features via an indirect interaction mode.

In some implementations, a direct or indirect interaction mode may be determined based on predicting a user interaction mode intent based on: (a) user motion; (b) user context; and/or (c) UI element positioning with respect to a user gaze position. Moreover, the system may provide feedback to indicate which hand is operating in which mode.

In some implementations, interaction functionalities may be mapped with respect to a left hand and a right hand. For example, a left hand may be designated as a direct interaction while operating in a dual interaction mode and a right hand may be designated as an indirect interaction while operating in a dual interaction mode.

In some implementations, a gaze direction may be associated with a specified hand. For example, a user may prefer to use a right hand for indirect interactions. In some implementations, a first hand may be associated with specified types and/or modes of interactions and a second hand may be associated with different types and/or modes of interactions.

In some implementations, a device has a processor (e.g., one or more processors) that executes instructions stored in a non-transitory computer-readable medium to perform a method. The method performs one or more steps or processes. In some implementations, the device receives data corresponding to user activity involving two hands of a user in a 3-dimensional (3D) coordinate system. Actions performed by the two hands may be identified based on the data corresponding to the user activity. Each of the two hands may perform one of the identified actions. It may be determined whether the identified actions satisfy a criterion based on the data corresponding to the user activity. In accordance with whether the identified actions satisfy the criterion, it may be determining to associate a first action of the actions performed by a first hand of the two hands with a first interaction mode based on a proximity of the first hand with respect to a first virtual object within the 3D coordinate system and it may be determined to associate a second action of the actions performed by a second hand of the of the two hands with a second interaction mode based on a hand gesture performed by the second hand in combination with a user gaze location determined based on a convergence point of a first ray extending from a first eye of the user and a second ray extending from a second eye of the user.

In some implementations, a device has a processor (e.g., one or more processors) that executes instructions stored in a non-transitory computer-readable medium to perform a method. The method performs one or more steps or processes. In some implementations, the device receives data corresponding to user activity involving two hands of a user in a 3-dimensional (3D) coordinate system. Actions performed by the two hands may be identified based on the data corresponding to the user activity. Each of the two hands may perform one of the identified actions. It may be determined whether the identified actions satisfy a criterion based on the data corresponding to the user activity and in accordance with whether the identified actions satisfy the criterion, it may be determined whether to associate each of the actions performed by each of the two hands with a direct interaction mode or an indirect interaction mode.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 7A-7D illustrate views of an XR environment including representations of direct and/or indirect hand/finger/gaze-based user input, in accordance with some implementations.

Figure 1A:
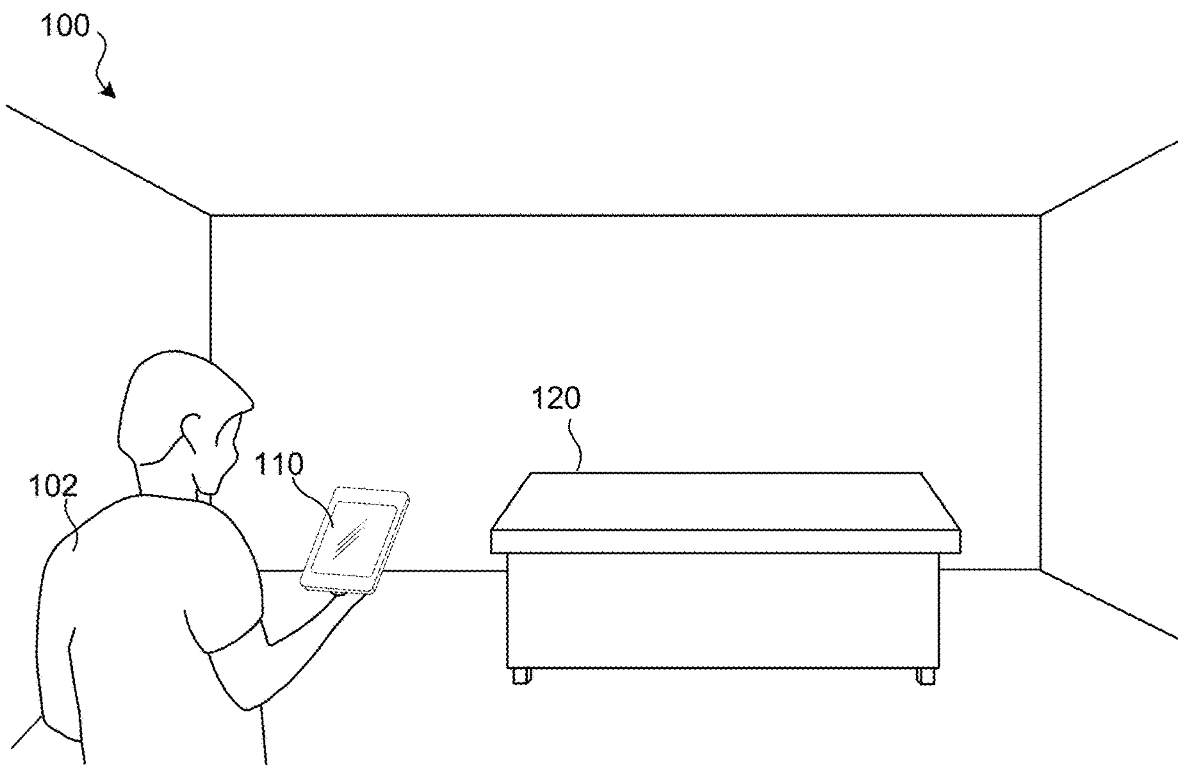
FIGS. 1A-B illustrate exemplary electronic devices operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1B:
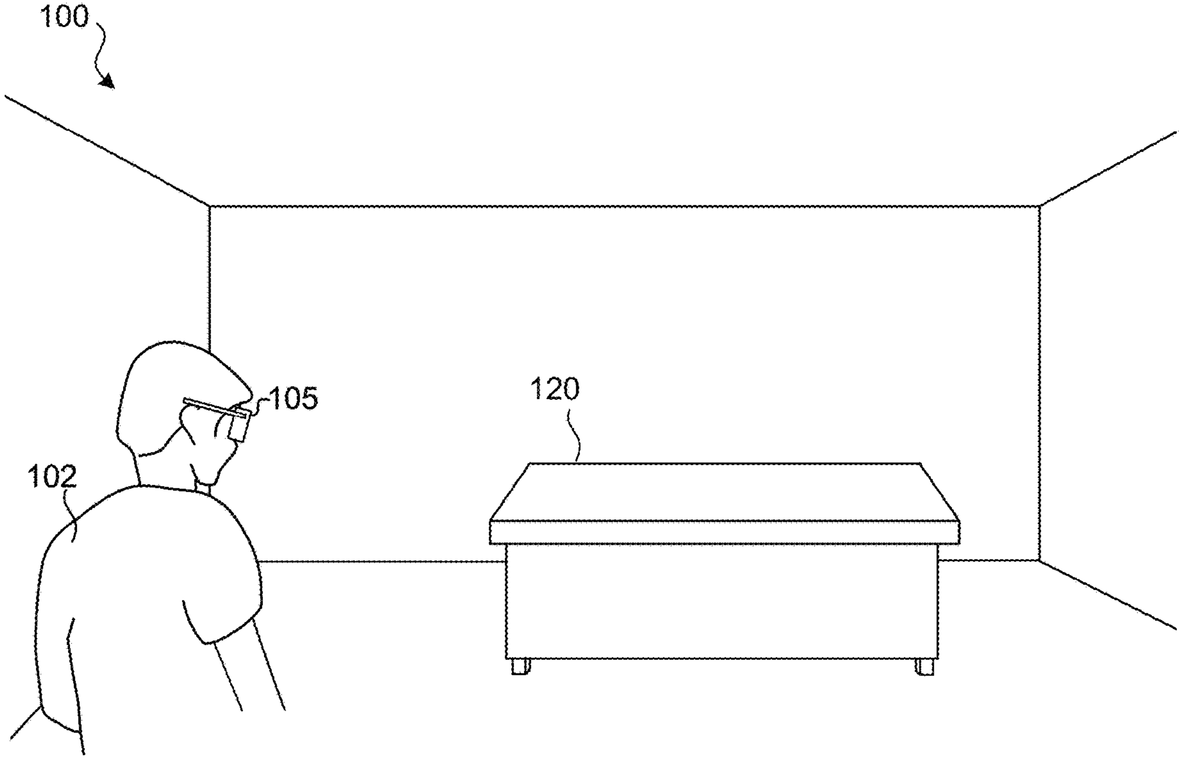

FIGS. 1A-B illustrate exemplary electronic devices 105 and 110 operating in a physical environment 100. In the example of FIGS. 1A-B, the physical environment 100 is a room that includes a desk 120. The electronic devices 105 and 110 may include one or more cameras, microphones, depth sensors, or other sensors that can be used to capture information about and evaluate the physical environment 100 and the objects within it, as well as information about the user 102 of electronic devices 105 and 110. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic devices 105 (e.g., a wearable device such as an HMD) and/or 110 (e.g., a handheld device such as a mobile device, a tablet computing device, a laptop computer, etc.). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system (i.e., a 3D space) associated with the XR environment, which may correspond to a 3D coordinate system of the physical environment 100.

In some implementations, video (e.g., pass-through video depicting a physical environment) is received from an image sensor of a device (e.g., device 105 or device 110). In some implementations, a 3D representation of a virtual environment is aligned with a 3D coordinate system of the physical environment. A sizing of the 3D representation of the virtual environment may be generated based on, inter alia, a scale of the physical environment or a positioning of an open space, floor, wall, etc. such that the 3D representation is configured to align with corresponding features of the physical environment. In some implementations, a viewpoint within the 3D coordinate system may be determined based on a position of the electronic device within the physical environment. The viewpoint may be determined based on, inter alia, image data, depth sensor data, motion sensor data, etc., which may be retrieved via a virtual inertial odometry system (VIO), a simultaneous localization and mapping (SLAM) system, etc.

In some implementations, various gestures may be enabled based on interpreting hand positions and/or hand movements via usage of sensor data. For example, sensor data may include, inter alia, image data captured by inward or outward facing cameras or sensors on a head-mounted device (HMD). In some implementations hand gestures may be enabled by two hands of a user such that each hand is configured to operate in a different operational mode such as a direct operational mode and/or an indirect operational mode.

In some implementations, a user may initiate an interaction associated with a visual object of a UI with a first hand while viewing a differing visual object of the UI such that the first hand of the user operates in a direct interaction mode and a second hand of the user operates in an indirect interaction mode. A direct interaction mode may include, for example, a user moving a first hand with respect to a displayed user interface to make contact with user interface controls. For example, the user may virtually press a UI button engaging a finger with the UI button in an extended reality (XR) environment. An indirect interaction mode may include, for example, the user gazing at a user interface and providing a hand gesture causing an interaction based on the gaze. For example, the user may gaze at a UI button and simultaneously perform a pinch gesture to provide a selection input to the UI button. In this example, only the indirect mode uses the user's gaze direction. Accordingly, the user may use one hand to perform direct interactions while simultaneously using the other hand and (user) gaze to provide indirect interactions. Gaze is defined herein as a location where the viewing rays of the eyes of a user converge.

In some implementations, electronic devices 105 and/or 110 may enable interactions such that a first hand of the user is configured to provide direct interactions and a second hand of the user is configured to provide indirect interactions. For example, a first hand may be configured to activate direct interaction controls of a UI and a second hand of the user may be configured to select interactions that are available to the first hand thereby combining direct interactions and indirect interactions. For example, a virtual slider (e.g., configured to control zoom functions) may be interacted with via a direct control panel while a user interacts with additional UI features via an indirect mode.

In some implementations, each hand of a user may be configured to independently interact in a direct interaction mode.

In some implementations, an interaction mode (e.g., a direct or indirect interaction mode associated with one or two hands) may be automatically determined in response to predicting a user intent with respect to user hand or body motion and/or specified context. In some implementations, a dual modality mode (e.g., a direct interaction mode for one hand and an indirect interaction mode for the other hand) may be determined via an algorithm or machine learning model. Some implementations may provide feedback to a user to indicate which hand is currently operating in which mode. For example, it may be determined which hand is associated with a gaze function or interaction.

In some implementations, interaction mode functionalities may be mapped to specified hands such as a left hand and a right hand. For example, a left hand may be designated as always being associated with direct interactions when operating in a dual interaction mode. Likewise, a right hand may be designated as always being associated with indirect interactions when operating in a dual interaction mode. Additionally, a gaze interaction may be associated with a specified hand such as a right hand or a left hand. For example, a user may prefer to use right hand for indirect interactions. In some implementations, a first hand is associated with first specified types/modes of interactions and a second hand is associated with second and differing types/modes of interactions.

In some implementations, a proximity to a specified type of UI (e.g., a defined functional space within a 3D space of an XR environment tied to a UI element) may be used to determine which hand is currently operating in a direct interaction mode. For example, a hand that is proximal or closest to a UI may be designated as operating in a direct interaction mode.

Some implementations may account for UI element positioning relative to a user and/or a gaze of the user with respect to determining when and how to implement a switch between interaction modes. For example, in response to determining that a user's gaze is offset from the user's fingertip (of a first hand) being operated with respect to direct input/touch, an indirect input mode may be enabled an for a second hand and associated with the user's gaze (i.e., a location where the viewing rays of the eyes of a user converge). Likewise, in response to determining that the user's gaze is focused with respect to a location that is close to the user's fingertip being operated with respect to direct input/touch, an indirect interaction mode and/or associated feedback may be disabled. For example, a gaze-based hover interaction may be disabled.

Figure 2:
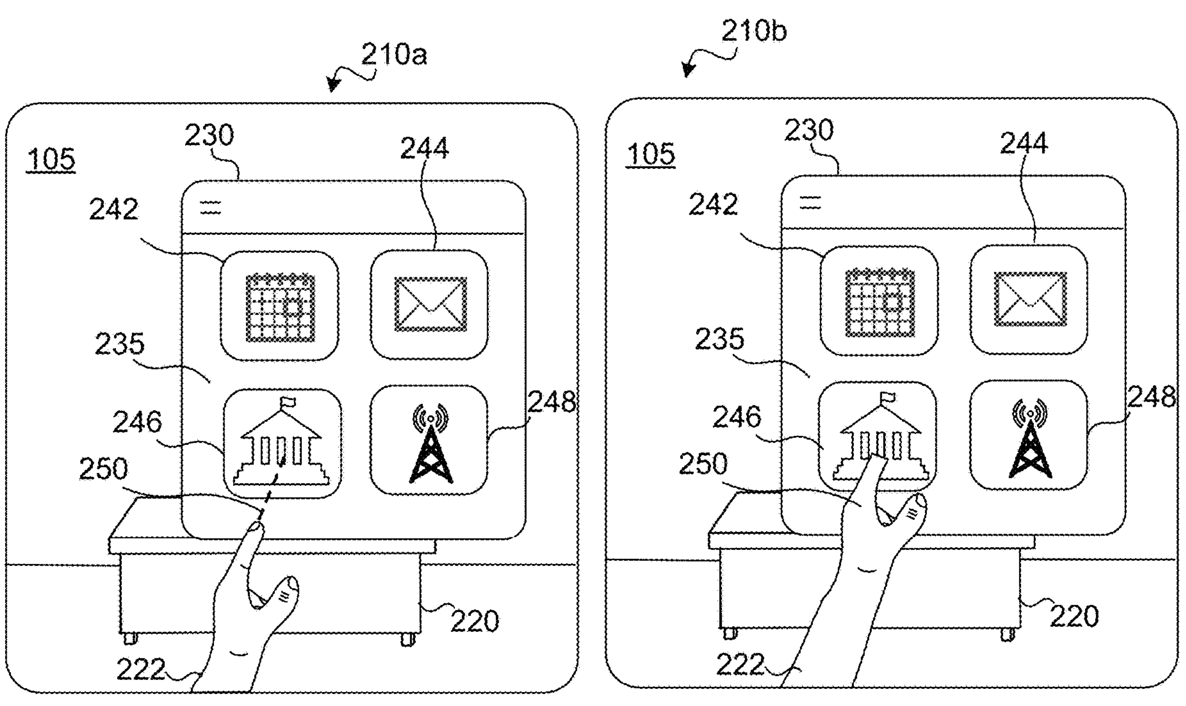
FIG. 2 illustrates views, provided via a device, of virtual elements within the 3D physical environment of FIGS. 1A-1B in which the user performs a direct interaction in accordance with some implementations.

FIG. 2 illustrates views, provided via a device, of virtual elements within the 3D physical environment of FIGS. 1A-1B in which the user performs a direct interaction associated with a process selecting an interaction mode such as, inter alia, a direct interaction mode. In this example, the user 102 makes a hand gesture relative to content presented in views 210*a-b* of an XR environment provided by a (e.g., device 105 or device 110). The views 210*a-b* of the XR environment include an exemplary user interface 230 of an application (i.e., an example of virtual content) and a depiction 220 of the desk 120 (i.e., an example of real content). Providing such a view may involve determining 3D attributes of the physical environment 100 and positioning the virtual content, e.g., user interface 230, in a 3D coordinate system corresponding to that physical environment 100.

In the example of FIG. 2, the user interface 230 includes various content items, including a background portion 235 and icons 242, 244, 246, 248. The icons 242, 244, 246, 248 may be displayed on the flat user interface 230. The user interface 230 may be a user interface of an application, as illustrated in this example. The user interface 230 is simplified for purposes of illustration and user interfaces in practice may include any degree of complexity, any number of content items, and/or combinations of 2D and/or 3D content. The user interface 230 may be provided by operating systems and/or applications of various types including, but not limited to, messaging applications, web browser applications, content viewing applications, content creation and editing applications, or any other applications that can display, present, or otherwise use visual and/or audio content.

In this example, the background portion 235 of the user interface 230 is flat. In this example, the background portion 235 includes all aspects of the user interface 230 being displayed except for the icons 242, 244, 246, 248. Displaying a background portion of a user interface of an operating system or application as a flat surface may provide various advantages. Doing so may provide an easy to understand or otherwise use portion of an XR environment for accessing the user interface of the application. In some implementations, multiple user interfaces (e.g., corresponding to multiple, different applications) are presented sequentially and/or simultaneously within an XR environment using one or more flat background portions.

In some implementations, the positions and/or orientations of such one or more user interfaces may be determined to facilitate visibility and/or use. The one or more user interfaces may be at fixed positions and orientations within the 3D environment. In such cases, user movements would not affect the position or orientation of the user interfaces within the 3D environment.

The position of the user interface within the 3D environment may be based on determining a distance of the user interface from the user (e.g., from an initial or current user position). The position and/or distance from the user may be determined based on various criteria including, but not limited to, criteria that accounts for application type, application functionality, content type, content/text size, environment type, environment size, environment complexity, environment lighting, presence of others in the environment, use of the application or content by multiple users, user preferences, user input, and numerous other factors.

In some implementations, the one or more user interfaces may be body-locked content, e.g., having a distance and orientation offset relative to a portion of the user's body (e.g., their torso). For example, the body-locked content of a user interface could be 0.5 meters away and 45 degrees to the left of the user's torso's forward-facing vector. If the user's head turns while the torso remains static, a body-locked user interface would appear to remain stationary in the 3D environment at 2 m away and 45 degrees to the left of the torso's front facing vector. However, if the user does rotate their torso (e.g., by spinning around in their chair), the body-locked user interface would follow the torso rotation and be repositioned within the 3D environment such that it is still 0.5 meters away and 45 degrees to the left of their torso's new forward-facing vector.

In other implementations, user interface content is defined at a specific distance from the user with the orientation relative to the user remaining static (e.g., if initially displayed in a cardinal direction, it will remain in that cardinal direction regardless of any head or body movement). In this example, the orientation of the body-locked content would not be referenced to any part of the user's body. In this different implementation, the body-locked user interface would not reposition itself in accordance with the torso rotation. For example, a body-locked user interface may be defined to be 2 m away and, based on the direction the user is currently facing, may be initially displayed north of the user. If the user rotates their torso 180 degrees to face south, the body-locked user interface would remain 2 m away to the north of the user, which is now directly behind the user.

A body-locked user interface could also be configured to always remain gravity or horizon aligned, such that head and/or body changes in the roll orientation would not cause the body-locked user interface to move within the 3D environment. Translational movement would cause the body-locked content to be repositioned within the 3D environment in order to maintain the distance offset.

In the example of FIG. 2, the user 102 moves their hand from an initial position as illustrated by the position of the depiction 222 in view 210*a*. The hand moves along path 250 to a later position as illustrated by the position of the depiction 222 in the view 210*b*. As the user 102 moves their hand along this path 250, the finger intersects the user interface 230. Specifically, as the finger moves along the path 250, it virtually pierces the icon 246 and thus a tip portion of the finger (not shown) is occluded in view 210*b* by the user interface 230.

Implementations disclosed herein interpret user movements such as the user 102 moving their hand/finger along path 250 relative to a user interface element such as icon 246 to recognize user input/interactions. The interpretation of user movements and other user activity may be based on recognizing user intention using multiple, potentially-separate, recognition processes corresponding to different input modalities. Using multiple, potentially-separate, recognition processes for different modalities may improve functionality, accuracy, efficiency, and/or provide other benefits.

Recognizing input in the example of FIG. 2 may involve determining that a gesture is a direct interaction and then using a direct input recognition process to recognize the gesture. For example, such a gesture may be interpreted as a tap input to the icon 246. In making such a gesture, the user's actual motion relative to the icon 246 may deviate from an ideal motion (e.g., a straight path through the center of the user interface element in a direction that is perfectly orthogonal to the plane of the user interface element). The actual path may be curved, jagged, or otherwise non-linear and may be at an angle rather than being orthogonal to the plane of the user interface element. The path may have attributes that make it similar to other types of input gestures (e.g., swipes, drags, flicks, etc.) For example, the non-orthogonal motion may make the gesture similar to a swipe motion in which a user provides input by piercing a user interface element and then moving in a direction along the plane of the user interface.

Some implementations disclosed herein determine that a direct interaction mode is applicable and, based on the direct interaction mode, utilize a direct interaction recognition process to distinguish or otherwise interpret user activity that corresponds to direct input, e.g., identifying intended user interactions, for example, based on if, and how, a gesture path intercepts one or more 3D regions of space. Such recognition processes may account for actual human tendencies associated with direct interactions (e.g., natural arcing that occurs during actions intended to be straight, tendency to make movements based on a shoulder or other pivot position, etc.), human perception issues (e.g., user's not seeing or knowing precisely where virtual content is relative to their hand), and/or other direct interaction-specific issues.

Note that the user's movement in the real world (e.g., physical environment 100) correspond to movements within a 3D space, e.g., an XR environment that is based on the real-world and that includes virtual content such as user interface positioned relative to real-world objects including the user. Thus, the user is moving his hand in the physical environment 100, e.g., through empty space, but that hand (i.e., a depiction or representation of the hand) intersects with and/or pierces through the user interface 300 of the XR environment that is based on that physical environment. In this way, the user virtually interacts directly with the virtual content.

Figure 3:
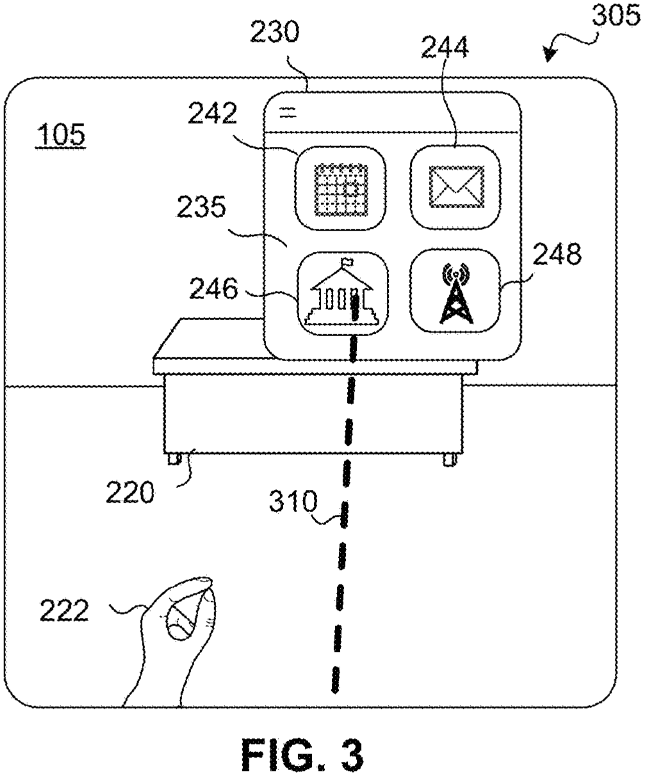
FIG. 3 illustrates an exemplary view in which the user performs an indirect interaction in accordance with some implementations.

FIG. 3 illustrates an exemplary view, provided via a device, of virtual elements within the 3D physical environment of FIGS. 1A-1B in which the user performs an indirect interaction associated with a process selecting an interaction mode such as, inter alia, an indirect interaction mode. In this example, the user 102 makes a hand gesture while looking at content presented in the view 305 of an XR environment provided by a (e.g., device 105 or device 110). The view 305 of the XR environment includes the exemplary user interface 230 FIG. 2. In the example of FIG. 3, the user 102 makes a pinching gesture with their hand as illustrated by the depiction 222 while gazing along gaze direction 310 at user interface icon 246. In this example, this user activity (e.g., a pinching hand gesture along with a gaze (i.e., a location where the viewing rays of the eyes of a user converge) at a UI element) corresponds to a user intention to interact with user interface icon 246.

Implementations disclosed herein interpret user activity, such as the user 102 forming a pinching hand gesture along with a gaze at a UI element, to recognize user/interactions. For example, such user activity may be interpreted as a tap input to the icon 246, e.g., selecting icon 246. However, in performing such actions, the user's gaze direction and/or the timing between a gesture the gaze with which the user intends the gesture to be associated may be less than perfectly executed and/or timed.

Some implementations disclosed herein determine that an indirect interaction mode is applicable and, based on the direct interaction mode, utilize an indirect interaction recognition process to identify intended user interactions based on user activity, for example, based on if, and how, a gesture path intercepts one or more 3D regions of space. Such recognition processes may account for actual human tendencies associated with indirect interactions (e.g., eye saccades, eye fixations, and other natural human gaze behavior, arching hand motion, retractions not corresponding to insertion directions as intended, etc.), human perception issues (e.g., user's not seeing or knowing precisely where virtual content is relative to their hand), and/or other indirect interaction-specific issues.

Some implementations determine an interaction mode, e.g., a direct interaction mode, an indirect interaction mode, and/or a combination of a direct interaction mode and an indirect interaction mode so that user behavior can be interpreted by a specialized (or otherwise separate) recognition process for the appropriate interaction type, e.g., using a direct interaction recognition process for direct interactions and an indirect interaction recognition process for indirect interactions. Such specialized (or otherwise separate) process utilization may be more efficient, more accurate, or provide other benefits relative to using a single recognition process configured to recognize multiple types (e.g., both direct and indirect) interactions.

The views illustrated in FIGS. 2 and 3 represent activities associated with direct interactions and indirect interactions and may be implemented for interpreting user activity involving both hands based on determining an interaction mode (e.g., direct or indirect) associated with each hand of a user. An interaction mode may be direct (e.g., using a finger to virtually press a displayed button within an XR environment) or indirect (e.g., gazing at a virtual button and performing a pinching interaction to select the virtual button). Two hands of a user may utilize a direct interaction mode, an indirect mode, or a combination of a direct interaction mode and an indirect interaction mode such that one hand uses a direct interaction mode and the other hand uses an indirect interaction mode. An interaction mode may be determined in response to predicting a user intent based on: user motion such as, inter alia, hand motion; user context; and/or UI element positioning with respect to a user gaze. Likewise, feedback may be provided to indicate which hand is operating in which mode.

Figure 4:
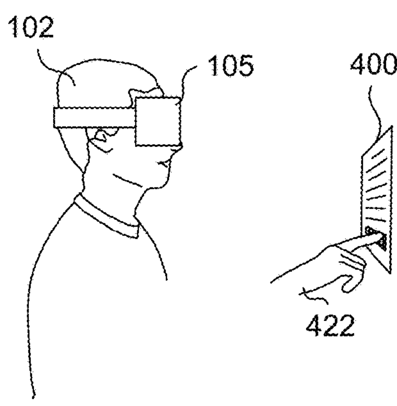
FIG. 4 illustrates an exemplary direct interaction involving a user's hand virtually touching a UI element of a user interface in accordance with some implementations.

FIG. 4 illustrates an exemplary direct interaction involving a user's hand 422 virtually touching a UI element of a user interface 400. In this example, the user 102 is using device 105 to view and interact with an XR environment that includes the user interface 400. A direct interaction recognition process may use sensor data and/or UI information to determine, for example, which UI element the user's hand is virtually touching and/or where on that UI element the interaction occurs. Direct interaction may additionally (or alternatively) involve assessing user activity to determine the user's intent, e.g., did the user intend to a straight tap gesture through the UI element or a sliding/scrolling motion along the UI element. Such recognition may utilize information about the UI elements, e.g., regarding the positions, sizing, type of element, types of interactions that are capable on the element, types of interactions that are enabled on the element, which of a set of potential target elements for a user activity accepts which types of interactions, etc.

Recognition of such an interaction may be based on functions performed both via a system process and via an application process. For example, an OS's input support process may interpret hands data from the device's sensors to identify an interaction event and provide limited or interpreted information about the interaction event to the application that provided the user interface 400. For example, rather than providing detailed hand information (e.g., identifying the 3D positions of multiple joints of a hand model representing the configuration of the hand 422), the OS input support process may simply identify a 2D point within the 2D user interface 400 on a UI element at which the interaction occurred, e.g., an interaction pose. The application process can then interpret this 2D point information (e.g., interpreting it as a selection, mouse-click, touch-screen tap, or other input received at that point) and provide a response, e.g., modifying its UI accordingly.

Figure 5:
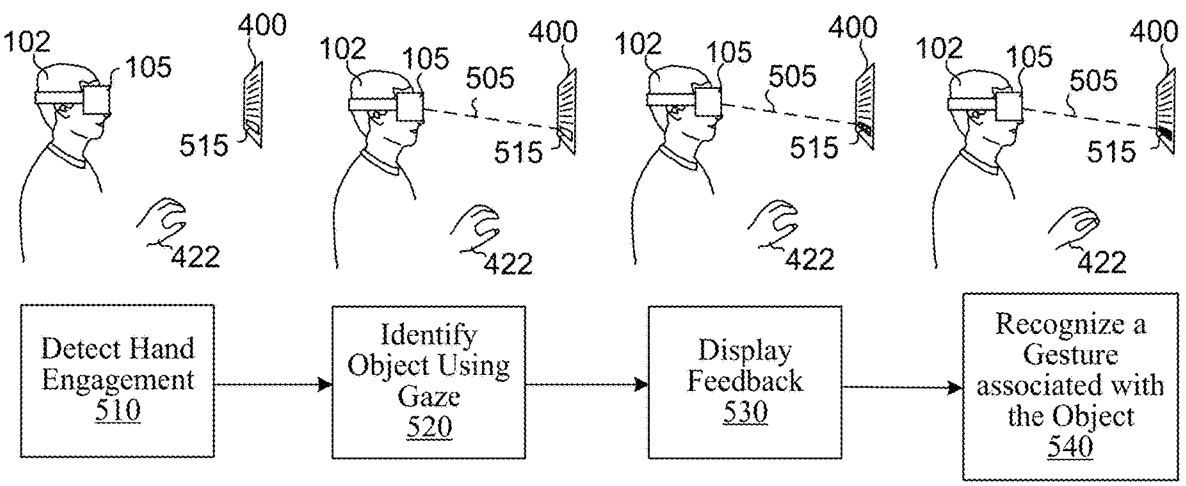
FIG. 5 illustrates indirect interaction recognition in accordance with some implementations.

FIG. 5 illustrates indirect interaction recognition. In this example, sensor data on device 105 and/or UI information are used to recognize a user interaction made by user 102, e.g., based on outward-facing image sensor data, depth sensor data, eye sensor data, motion sensor data, etc. and/or information made available by an application providing the user interface. Sensor data may be monitored to detect user activity corresponding to an engagement condition corresponding to the start of a user interaction.

In this example, at block 510, the process detects that the user 102 has positioned their hand 422 within view of outward facing image sensors. It may detect a particular hand configuration, e.g., a claw shape, a flat hand, a steady hand in any configuration, etc., as an indication of hand engagement or may simply detect the presence of the hand within sensor view.

At block 520, the process identifies an object using user gaze data. In this example, the process identifies that the gaze direction 505 of user 102 is on user interface element 515.

At block 530, the process displays feedback based on the object identified by the gaze. In this example, the feedback distinguishes user interface element 515 graphically to indicate that the user interface element 515 now has a different state (e.g., a "hover" state that is analogous to the state of a traditional UI icon when a cursor is on the item without clicking/tapping). In this example, the application that provided the UI information need not be notified of the hover state and associated feedback. Instead, the hand engagement, object identification via gaze, and display of feedback can be handled out of process (i.e., outside of the application process), e.g., by the operating system processes. For example, such processes may be provided via an operating system's input support process. Doing so may reduce or minimize potentially sensitive user information (e.g., such as constant gaze direction vectors) that might otherwise be provided to application to enable the application to handle these functions within the application process. Whether and how to display feedback may be specified by the application even though it is carried out of process. For example, the application may define that an element should display hover or highlight feedback and define how the hover or highlight will appear such that the out of process aspect (e.g., operating system) may provide the hover or highlight according to the defined appearance. Alternatively, feedback can be defined out-of-process (e.g., solely by the OS) or defined to use a default appearance/animation if the application does not specify an appearance.

At block 540, the process recognizes a gesture to be associated with the identified object. In this example, the user is gazing in gaze direction 505 at user interface object 515 while (or at least near in time) to a pinch gesture by hand 422. This pinch gesture, in this example, is interpreted to initiate an action upon the user interface object 515, e.g., causing a selection action that is analogous to a cursor "click" event of a traditional UI icon during which a cursor is positioned on an icon and a trigger such as a mouse click or track pad tap is received or similarly analogous to a touch screen "tap" event.

Recognition of such an interaction may be based on functions performed both via a system process and via an application process. For example, an OS's input process may interpret hands and gaze data from the device's sensors to identify an interaction event and provide limited or interpreted/abstracted information about the interaction event to the application that provided the user interface 400. For example, rather than providing gaze direction information identifying gaze direction 505, the OS input support process may identify a 2D point within the 2D user interface 400 on the UI element 515, e.g., an interaction pose. The application process can then interpret this 2D point information (e.g., interpreting it as a selection, mouse-click, touch-screen tap, or other input received at that point) and provide a response, e.g., modifying its UI accordingly.

FIG. 5 illustrates examples of recognizing indirect user interactions. Numerous other types of indirect interactions can be recognized, e.g., based on one or more user actions identifying a user interface element and/or one or more user actions providing input (e.g., no-action/hover type input, selection type input, input having a direction, path, speed, acceleration, etc.). Input in 3D space that is analogous to input on 2D interfaces may be recognized, e.g., input analogous to mouse movements, mouse button clicks, touch screen touch events, trackpad events, joystick events, game controller events, etc.

Some implementations utilize an out of process (i.e., outside of an application process) input support framework to facilitate accurate, consistent, and efficient input recognition in a way that preserves private user information. For example, aspects of the input recognition process may be performed out of process such that applications have little or no access to information about where a user is looking, e.g., gaze directions. In some implementations, application access to some user activity information (e.g., gaze direction-based data) is limited to only a particular type of user activity, e.g., activity satisfying particular criteria. For example, applications may be limited to receive only information associated with deliberate or intentional user activity, e.g., deliberate or intentional actions indicative of an intention to interact with (e.g., select, activate, move, etc.) a user interface element.

Some implementations recognize input using functional elements performed both via an application process and a system process that is outside of the application process. Thus, in contrast to a framework in which all (or most) input recognition functions are managed within an application process, some algorithms involved in the input recognition may be moved out of process, i.e., outside of the application process. For example, this may involve moving algorithms that detect gaze input and intent out of an application's process such that the application does not have access to user activity data corresponding to where a user is looking or only has access to such information in certain circumstances, e.g., only for specific instances during which the user exhibits an intent to interact with a user interface element.

Some implementations recognize input using a model in which an application declares or otherwise provides information about its UI elements so that a system process that is outside of the application process can better facilitate input recognition. For example, an application may declare the locations and/or UI behaviors/capabilities of its buttons, scroll bars, menus, objects, and other UI elements. Such declarations may identify how a user interface should behave given different types of user activity, e.g., this button should (or should not) exhibit hover feedback when the user looks at it.

The system process (e.g., outside of the application process) may use such information to provide the desired UI behavior (e.g., providing hover feedback in appropriate user activity circumstances). For example, the system process may trigger hover feedback for a UI element based on a declaration from the application that the app's UI includes the element and that it should display hover feedback, e.g., when gazed upon. The system process may provide such hover feedback based on recognizing the triggering user activity (e.g., gaze at the UI object) and may do so without revealing to the application the user activity details associated with the user activity that triggered the hover, the occurrence of the user activity that triggered the hover feedback, and/or that the hover feedback was provided. The application may be unaware of the user's gaze direction and/or that hover feedback was provided for the UI element.

In another example, an application declares a menu as part of its user interface and declares that the menu is expandable using a set of identified expanded menu options. The system process may handle the expansion of the UI menu. The system process may provide menu expansion (e.g., via a system process outside of the application process) based on recognizing a triggering user activity (e.g., gaze at the menu's label) and may do so without revealing to the application the user activity details associated with the user activity that triggered the menu expansion, the occurrence of the user activity that triggered the menu expansion, and/or that the fact that the menu was expanded. The application may be unaware of the user's gaze direction and/or that the menu was expanded.

Some aspects of input recognition may be handled by the application itself, i.e., in process. However, the system process may filter, abstract, or otherwise manage the information that is made available to the application to recognize input to the application. The system process may do so in ways that facilitate input recognition that is efficient, accurate, consistent (within the application and across multiple applications), and that allow the application to potentially use easier-to-implement input recognition and/or legacy input recognition processes, such as input recognition processes developed for different systems or input environment, e.g., using touch screen input processes used in legacy mobile apps.

Some implementations, use a system process to provide interaction event data to applications to enable the applications to recognize input. The interaction event data may be limited so that all user activity data is not available to the applications. Providing only limited user activity information may help protect user privacy. The interaction event data may be configured to correspond to events that can be recognized by the application using a general or legacy recognition process. For example, a system process may interpret 3D user activity data to provide interaction event data to an application that the application can recognize in the same way that the application would recognize a touch event on a touch screen. In some implementations, an application receives interaction event data corresponding to only certain types of user activity, e.g., intentional or deliberate actions on user interface objects, and may not receive information about other types of user activity, e.g., gaze only activities, a user moving their hands in ways not associated with UI-interactions, a user moving closer to or further away from the user interface, etc. In one example, during a period of time (e.g., a minute, 10 minutes, etc.) a user gazes around a 3D XR environment including gazes at certain user interface text, buttons, and other user interface elements and eventually performs an intentional UI interaction, e.g., by making an intentional pinch gesture while gazing at button X. A system process may handle all of the user interface feedback during the gazing around at the various UI elements without providing the application information about these gazes. On the other hand, the system process may provide interaction event data to the application based on the intentional pinch gesture while gazing at button X. However, even this interaction event data may provide limited information to the application, e.g., providing an interaction position or pose identifying an interaction point on button X without providing information about the actual gaze direction. The application can then interpret this interaction point as an interaction with the button X and respond accordingly. Thus, user behavior that is not associated with intentional user interactions with UI elements (e.g., gaze only hover, menu expansion, reading, etc.) are handled out of process without the application having access to user data and the information about the intentional user interface element interactions is limited such that it does not include all of the user activity details.

Figure 6:
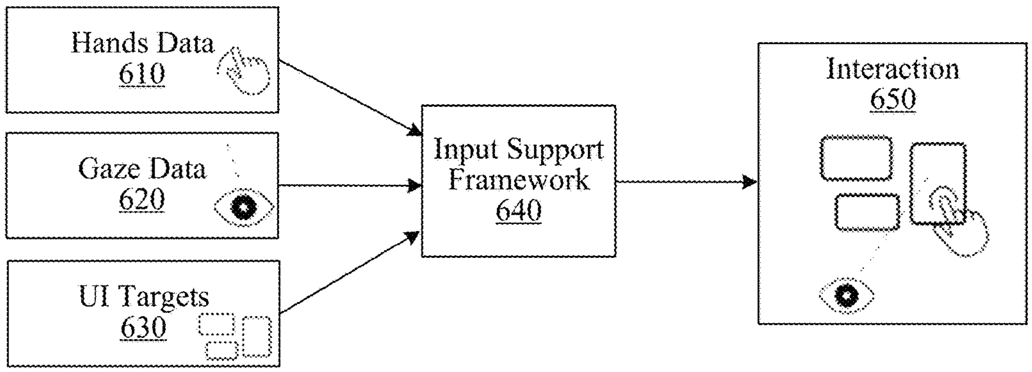
FIG. 6 illustrates use of an exemplary input support framework to generate interaction data based on hands data, gaze data, and UI target data to produce interaction data in accordance with some implementations.

FIG. 6 illustrates use of an exemplary input support framework 640 to generate interaction data based on hands data 610, gaze data 620, and UI target data 630 to produce interaction data 650 that can be provided to one or more applications and/or used by system processes to provide a desirable user experience. In some implementations, the input support process 640 is configured to understand a user's intent to interact, generate input signals and events to create reliable and consistent user experiences across multiple applications, detect input out-of-process and route it through the system responsibly. The input support process 640 may arbitrate which application, process, and/or UI element should receive user input, for example, based identifying which application or UI element is the intended target of a user activity. The input support process 640 may keep sensitive user data, e.g., gaze, hand/body enrollment data, etc., private; only sharing abstracted or high-level information with applications.

The input support process may take hands data 610, gaze data 620, and UI target data 630 and determine user interaction states. In some implementations, it does so within a user environment in which multiple input modalities are available to the user, e.g., an environment in which a user can interact directly as illustrated in FIG. 2 or indirectly as illustrated in FIG. 3 to achieve the same interactions with UI elements. For example, the input support process may determine that the user's right hand is performing an intentional pinch and gaze interaction with a user interface element, that the left hand is directly tapping a user interface element, or that the left hand is fidgeting and therefor idle/doing nothing relevant to the user interface.

Based on determining a user intent to interact, the input support framework 640 may generate interaction data 650 (e.g., including an interaction pose, manipulator pose, and/or interaction state). The input support framework may generate input signals and events that applications may consume without needed custom or 3D input recognition algorithms in process. In some implementations, the input support framework provides interaction data 650 in a format that an application can consume as a touch event on a touch screen or as track pad tap with a 2D cursor at a particular position. Doing so may enable the same application (with little or no additional input recognition processes) to interpret interactions across different environments including new environment for which an application was not originally created and/or using new and different input modalities. Moreover, application responses to input may be more reliable and consistent across applications in a given environment and across different environments, e.g., enabling consistent UI responses for 2D interactions with the application on tablets, mobile devices, laptops, etc. as well as for 3D interactions with the application on an HMD and/or other 3D/XR devices.

The input support framework may also manage user activity data such that different apps are not aware of user activity relevant to other apps, e.g., one application will not receive user activity information while a user types a password into another app. Doing so may involve the input support framework accurately recognizing to which application a user's activity corresponds and then routing the interaction data 650 to only the right application. The input support framework may use details about the UIs of multiple, potential target apps to disambiguate input.

The examples illustrated in FIGS. 4, 5, and 6 represent implementation activities associated with direct interactions and indirect interactions and may be used as input to automatically determine an interaction mode (for one or two hands of a user) based on a predicted the user intent with respect to user motion and/or context.

FIGS. 7A-7D illustrate views 710A-710D of an XR environment 710, provided by the device 105 and/or device 110 of FIG. 1, including representations of direct and/or indirect hand/finger/gaze-based user input (e.g., gesture(s)). Each of FIGS. 7A-7D includes an exemplary user interface 750 and a depiction 721 of desk 121 (e.g., a representation of a physical object that may be viewed as pass-through video or may be a direct view of the physical object through a transparent or translucent display) of FIGS. 1A-1B. Additionally, FIGS. 7A-7D include various representations of hand and finger movement/finger pinch (e.g., fingers coming together and touching) gestures 725*a*-725*f* of hands (comprising fingers) 726*a* and 726*b* of user 102 of FIG. 1. FIGS. 7B-7C include various combinations of representations of gestures 725*c*-725*d* of hands (comprising fingers) 726*a* and 726*b* in combination with gaze-based gestures 760*a*-760*c*. Providing such a view may involve determining 3D attributes of the physical environment 100 and positioning virtual content, e.g., user interface 250, in a 3D coordinate system corresponding to that physical environment 100.

In the examples of FIGS. 7A-7D, the user interface 750 includes various user interface (visual) elements 750*a*-750*f* (e.g., applications or icons representing software applications) and optional indicators 720 (e.g., a pointer, a highlight structure, etc.) for indicating a point of interaction with user interface 750 and any of user interface (visual) elements 750*a*-750*f*. User interface elements 750*a*-750*f* may be displayed with 3D effects within views 710A-710D provided by devices 105 and/or 110. The user interface 750 is simplified for purposes of illustration and user interfaces in practice may include any degree of complexity, any number of differing applications and/or computer interaction-based items, and/or combinations of 2D and/or 3D content. The user interface 750 may be provided by operating systems and/or applications (user interface elements) of various types including, but not limited to, messaging applications, web browser applications, content viewing applications, content creation and editing applications, or any other applications that can display, present, or otherwise use visual and/or audio content.

Each of FIGS. 7A-7D illustrates a different user interaction with applications 750*a*-750*f* and/or user interface 750. The different user interactions may be implemented via hand and finger movement/finger pinch gestures 725*a*-725*f* executed individually or in combination by hand 726*a*, and/or 726*b* and/or gaze gestures 760*a*-760*c*. For example, FIG. 7A illustrates a view 710A of XR environment 710 that includes a representation of a hand 726*a* of user 102 enabling a (direct) gesture 725*a* and a hand 726*b* enabling a (direct) gesture 725*b* for interacting with user interface 750.

User interactions implemented via execution of various hand movement, finger movement, and/or gaze-based gestures may include, inter alia, moving user interface 750 and/or any of user interface elements 750*a*-750*f* to another location within XR environment 710, performing a zoom in or zoom out function with respect to any object, such as user interface 750 and/or user interface elements 750*a*-750*f*, within XR environment, modifying a viewpoint within XR environment, enabling or opening any of user interface elements 750*a*-750*f*, etc.

Views 710A-710D illustrate examples associated with interpreting user activity involving two hands of a user in response to determining an interaction mode associated with each of the two hands. An interaction mode may be determined to be a direct interaction mode such as, inter alia, a user engaging a finger with a displayed button, of a user interface within an XR environment, to virtually enable (e.g., press) the displayed button. Alternatively, the interaction mode may be determined to be an indirect interaction mode such as, inter alia, a user gazing at a displayed button and performing a pinch gesture to select the displayed button. In the examples illustrated in FIGS. 7A-7D both hands of a user may enable or use a direct interaction mode or an indirect interaction mode. Likewise, in the examples illustrated in FIGS. 7A-7D, one hand of a user may enable or use a direct interaction mode while the other hand of the user enables or uses an indirect interaction mode. An interaction mode may be determined in response to predicting user intent based on:

(a) User motion.

(b) User context.

(c) A UI element position with respect to a user gaze.

(d) A UI element position with respect to a hand location causing a direct interaction with a UI element.

FIG. 7A, illustrates a view 710A of XR environment 710 that includes a representation of a hand 726*a* and a hand 726*b* of user 102 enabling a gesture 725*a* associated with a direct interaction mode and a gesture 725*b* associated with a direct interaction mode for interacting with XR environment 710. Gesture 725*a* and gesture 725*b* represent hand/finger movement gestures (e.g., a movement of hand 726*a* with a finger pointing and hand 726*b* with a finger pointing in any of X, Y, and Z directions 735). While gestures 725*a* and 725*b* are being executed (e.g., by user 102 of FIG. 1), sensors (e.g., cameras such as inward facing cameras and outward facing cameras of an HMD, depth sensors, infrared sensors, heat map sensors, etc.) of device 105 and/or 110 generate sensor data (e.g., image data, depth data, heat map data, etc.) describing, defining, or otherwise corresponding to actions/activity associated with gestures 725*a* and 725*b* for identification. The activity/actions associated with each of the identified gestures 725*a* and 725*b* are used to determine whether each of the activity/actions associated with each of the identified gestures 725*a* and 725*b* is in a direct interaction mode or an indirect interaction mode. View 710A illustrates both gesture 725*a* and gesture 725*b* being associated with a direct interaction mode where the user is using at least a portion of both hands 726*a* and 726*b* (i.e., fingers) to select or interact with user interface elements 750*a* and 750*f* by making virtual contact with user interface elements 750*a* and 750*f*, such as by virtually engaging each finger of hands 726*a* and 726*b* with user interface elements 750*a* and 750*f*, respectively. For example, it may be determined that gesture 725*a* and gesture 725*b* are associated with direct interaction mode by determining that a finger (of hands 726*a* and 726*b*) is located within a threshold distance of one of user interface elements 750*a* and 750*f* and/or the finger's distance to an object follows a predetermined trajectory (e.g., the finger initially moves toward one of user interface elements 750*a* and 750*f*, touches or moves within a threshold distance to one of user interface elements 750*a* and 750*f*, and subsequently moves away from one of user interface elements 750*a* and 750*f*). Likewise, a user gazing at one of user interface elements 750*a* and 750*f* while the finger moves within a threshold distance may additionally provide a strong indication that the user intends to execute a direct interaction with one of user interface elements 750*a* and 750*f*. Examples of implementing a direct interaction may include, inter alia, moving user interface 750 and/or any of user interface elements 750*a*-750*f* to another location within XR environment 710, performing a zoom in or zoom out function with respect to any object, such as user interface 750 and/or user interface elements 750*a*-750*f*, within the XR environment, modifying a viewpoint within the XR environment, enabling or opening any of user interface elements 750*a*-750*f*, etc.

In some implementations, an algorithm or machine learning model may be executed to automatically associate each activity/action associated with each of the identified gestures 725*a* and 725*b* with a direct interaction mode based on predicting a user's intent in response to user motion and/or context.

FIG. 7B illustrates a view 710B of XR environment 710 that includes a representation of hand 726*a* and hand 726*b* of user 102 enabling a gesture 725*c* associated with an indirect interaction mode and a gesture 725*d* associated with an indirect interaction mode for interacting with XR environment 710. Gesture 725*c* and gesture 725*d* represent hand/finger movement gestures (e.g., a movement of hand 726*a* and/or hand 726*b* in any of X, Y, and Z directions 735) in combination with finger pinch gestures such as, inter alia, thumb to index finger, thumb to pointer finger, thumb to long finger, thumb to ring finger, thumb to pinky finger, thumb to any combination of fingers, etc.

In contrast to view 710A of FIG. 2A, view 710B of FIG. 7B may execute an algorithm or machine learning model to automatically associate each activity/action associated with each of the identified gestures 725*c* and 725*d* with an indirect interaction mode based on predicting a user's intent in response to user motion, user gaze, and/or context.

In the example illustrated in FIG. 7B, a first user gaze direction/location (illustrated by ray 260*a*) is detected with respect to user interface element 750*c*. The detected first user gaze direction/location occurs simultaneously while the user performs gesture 725*c* (e.g., a pinch gesture) to provide a selection input to user interface element 750*c*. Likewise, a second user gaze direction/location (illustrated by ray 260*b* and occurring at a different time than the first user gaze direction) is detected with respect to user interface element 750*d*. The detected second user gaze direction/location occurs simultaneously while the user performs gesture 725*d* (e.g., a pinch gesture) to provide a selection input to user interface element 750*d*. In this example, an indirect interaction mode uses user gaze direction/location. Accordingly, the user uses both hands 726*a* and 726*b* performing finger pinch gestures in combination with user gaze direction/location to perform indirect interactions. Alternatively, both hands 726*a* and 726*b* may perform finger pinch gestures at a same time resulting in execution of one two-handed gesture such as, inter alia, zooming in/out or panning.

FIG. 7C illustrates a view 710C of XR environment 710 that includes a representation of a hand 726*a* of user 102 enabling a gesture 725*d* associated with an indirect interaction mode and a hand 726*b* of user 102 enabling a gesture 725*b* associated with a direct interaction mode for interacting with XR environment 710. Gesture 725*d* represents a hand/finger movement gesture (e.g., a movement of hand 726*a* in any of X, Y, and Z directions 735) in combination with a finger pinch gesture. Gesture 725*b* represents a hand/finger movement gesture (e.g., a movement of hand 726*b* with a finger pointing in any of X, Y, and Z directions 735).

In contrast to view 710A of FIG. 7A and view 710B of FIG. 7B, view 710C of FIG. 7C may execute an algorithm or machine learning model to automatically associate an activity/action associated with identified gesture 725*d* with an indirect interaction mode based on predicting a user's intent in response to user motion, user gaze, and/or context. Likewise, an algorithm or machine learning model may be executed to automatically associate an activity/action associated with identified gesture 725*b* with a direct interaction mode based on predicting a user's intent in response to user motion and/or context.

In the example illustrated in FIG. 7C, a user gaze direction/location (illustrated by ray 260*c*) is detected with respect to user interface element 750*c*. The detected user gaze direction/location occurs simultaneously while the user performs gesture 725*d* (e.g., a pinch gesture) to provide a selection input to user interface element 750*c*. Likewise, gesture 725*b* is detected as being associated with a direct interaction mode such that the user is determined to be using at least a portion of hand 726*b* (e.g., a finger) to directly enable user interface element 750*a* by moving hand 726*b* relative to user interface 750 to make virtual contact with user interface element 750*a* by virtually engaging with user interface element 750*a* by engaging a finger with user interface element 750*a*. Accordingly, the user uses hand 726*a* performing a finger pinch gesture in combination with a user gaze direction/location to perform an indirect interaction while the user uses hand 726*a* to perform a direct interaction. The performance of the indirect interaction and the direction interaction can occur simultaneously or at different instances of time.

In the example illustrated in FIG. 7D, a user is determined to be performing a direct interaction and an indirect interaction simultaneously. For example, FIG. 7D illustrates the user performing a gesture 725*f* that comprises directly adjusting a scroll bar UI element 751 with hand 726*a* in direct interaction mode simultaneously while hand 726*b* is performing a pinch and rotation (e.g., in any of X, Y, and Z directions 735) gesture 725*e* with respect to an object (e.g., one of user interface elements 750*a*-750*f*) being modified by the other hand's 726*a* direct interaction with scroll bar UI element 751. In this example, the device (e.g., device 105 of FIG. 1B) is configured to associate hand 726*a* with a direct interaction and the hand 726*b* with an indirect interaction mode. In some implementations, the direct interaction mode may be initiated first and then the indirect interaction may be initiated while the direct interaction mode is still occurring. In the aforementioned configuration, the device may activate a two-handed two-gesture mode where each hand is associated with and interpreted to be using their respective input modes.

Figure 8:
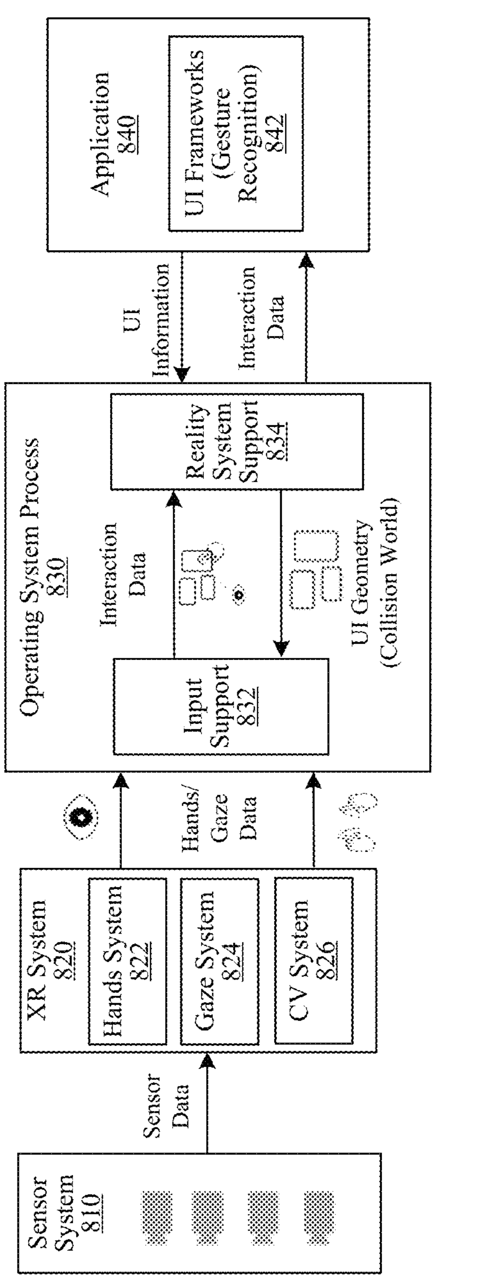
FIG. 8 illustrates an exemplary architecture that receives user activity data and application UI information at a system process that outputs interaction events data, in accordance with some implementations.

FIG. 8 illustrates an exemplary architecture that receives user activity data and application UI information at a system process that outputs interaction events data, in accordance with some implementations. The interaction events data is configured for one or more applications and/or user interface elements to use to recognize input gestures for determining to associate actions performed by each of two hands of a user with a direct interaction mode or an indirect interaction mode.

A direct interaction mode and an indirect interaction mode may be determined in response to interpreting hand and finger positions, hand movements, and/or gaze positions using sensor data such as image or other types of sensor data captured via inward and/or outward facing sensors on an HMD. In the example illustrated in FIG. 8, a sensor system 810 and an XR system 820 may be considered a sensing layer, e.g., determining where a user's hands are in a 3-dimensional (3D) world, where the user is gazing in the 3D world, etc., and the OS process 830 and application 840 may be considered an interaction layer, e.g., determining what the user intends to interact with, how the user intends to interact, etc.

The sensor system 810 may include various sensors, including, but not limited to, color/RGB image sensors, greyscale image sensors, depth sensors, dynamic vision sensors, motion sensors, etc. The sensor systems may include Image Signal Processor (ISP) components and/or other components that process sensor data.

The sensor system 810 may provide the sensor data to the XR system 820 in various forms. In some implementations, sensor data is sent over time, periodically, and/or at a fixed rate, e.g., at X frames of sensor data per second (fps). In one example, hands data based on images captured by one or more outward facing image sensors (e.g., on a device such as an HMD) is sent to the XR system 820 at a fixed rate (e.g., 10 fps, 20 fps, 30 fps, 60 fps, 120 fps, etc.). In another example, such hands data is sent at a non-fixed rate or otherwise irregularly. In one example, gaze data based on images captured by one or more inward facing image sensors (e.g., on the inside of a device such as an HMD) is sent to the XR system 820 at a fixed rate (e.g., 10 fps, 20 fps, 30 fps, 60 fps, 120 fps, etc.). In another example, such gaze data is sent at a non-fixed rate or otherwise irregularly. Hands data and gaze data may be sent to the XR system 820 at the same or different rates and/or the same or different times. The sensor data may include additional types of information and/or may provide information about other parts of the user or the physical environment in which the user is within. Such other sensor data may be provided at the same or different rates and/or at the same or different times as the hands data and/or gaze data.

The XR system 820 utilizes the received sensor data to perform user activity monitoring and/or tracking. In one example, the XR system 820 is configured to provide relatively low-level tracking algorithms. For example, the hands system 822 of the XR system 820 may use the sensor data to perform a hand tracking algorithm to track the positions, pose (e.g., position and orientation), configuration (e.g., shape), or other aspects of the hand over time. The hands system 822 may generate, update, and/or track a 3D model of a hand, e.g., a model of the hand that represents the hand's shape using defined "joints" or nodes that may or may not correspond to the user's physiological hand joints. In one example, a hand model of 20+ joints is maintained over time based on the sensor data such that the hands data generated by hands system 822 represents the current position/pose/configuration of the hand at different points in time, which may enable determining 3D movements or other changes made by a hand over time. The hands system may alternatively (or additionally) track a subset of points on a surface of the user's hand, e.g., tracking the positions of one or more fingertips/thumb-tips of the user's hand. Such tracking may, but need not, include determining when such portions (e.g., fingertips/thumb-tips) are touching one another and/or other portions of the user or the physical environment. The hands system 822 may output hand position, pose, and/or configuration information as well as confidence values corresponding to such hand data.

The gaze system 824 of the XR system 820 may use the sensor data to perform a gaze tracking algorithm to track eye characteristics such as, but not limited to gaze direction, over time. The gaze system 824 may use the sensor data to directly (e.g., without modeling the shape of the eye and/or head) determine a gaze direction of one or two eyes. The gaze system 824 may use the sensor data to generate, update, and/or track a 3D model of an eye, e.g., a model of the eye that represents the eye's shape based on identifying the positions of points (e.g., eyeball center, cornea center, pupil center, etc.), dimensions (e.g., eye-ball diameter, pupil diameter, etc.), and/or surface portions of the eye. In one example, the gaze system 824 outputs a stream of gaze directions (e.g., vector in 3D space or relative to the user's current position) of each eye over time. In one example, the gaze system 824 outputs gaze directions and confidence values corresponding to such gaze directions.

The XR system 820 may include a computer vision (CV) system 826 that underpins or otherwise supports the hands system 822, gaze system 824, and/or other XR system sub-systems (not shown). For example, the CV system 826 may perform one or more environment and/or user assessment algorithms, e.g., performing simultaneous localization and mapping (SLAM) to model the 3D physical environment and keep track of the user's position relative to that model. In another example, the CV system 826 may identify objects such as walls, doors, tables, appliances, etc., within the physical environment and/or the positions of such objects. In another example, the CV system 826 may perform a semantic understanding algorithm to semantically label objects within the physical environment. In another example, the CV system 826 may use sensor data associated to assess user characteristics (e.g., type of activity currently being performed (e.g., exercise, work, meditation, etc.), posture/motion (e.g., sitting, standing, walking, running, driving, etc.), and/or other user characteristics). Such user characteristic data may be used by hands system 822 and/or gaze system 824 to improve their efficiency and/or accuracy.

In FIG. 8, the XR system 820 provides hands/gaze data to the operating system process 830. The hands/gaze data may be provided periodically (e.g., at a fixed frame rate corresponding to the sensor capture rate or otherwise) or irregularly. In one example, the hands data is provided at the same frame rate per second as the gaze data. In another example, the hands data is provided at a different frame rate than the gaze data.

The hands/gaze data received by the operating system process 830 may be used by the input support process 832 to (1) itself provide/initiate some responses on to user activity on behalf of the application 840, (2) provide some information (e.g., interaction data) to the application 840 to enable the application 840 to respond to user activity, and/or (3) determine a user's intent to associate each of the actions performed hands of a user with a direct interaction mode or an indirect interaction mode. The input support process 840 and operating system process 830 may provide an application with information about a first type of user activity or gesture (e.g., a gesture determined to correspond to a direct interaction mode). Thus, as illustrated in FIG. 8, the input support process 832 generates interaction data that is provided to the application 840. This interaction data provided to the application 840 may exclude or convert/abstract the hands/gaze data (and other user-based information). The application 840 may receive only interaction data and thus may not receive data about other types of user activities, e.g., user activity deemed to be something other than an intentional interaction with a UI element such as user activity in which the user is simply gazing over the UI or other portions of an XR environment or during which the user is reading text displayed within the application's UI. Note that, in this example of FIG. 8, the interaction data provided by the input support process 832 is provided to the application 840 via a reality system support 834. However, in other examples, the input support process 832 may provide such interaction data to the application 840 directly or via a different intermediary.

In some implementations, the input support system 832 uses information about the user interface of one or more applications such as application 840 to provide input support to those applications. In some implementations, the application 840 sends user interface information to input support system 832 that the input support system 832 utilizes to interpret user interaction associations (e.g., with a direct interaction mode or an indirect interaction mode) associated with the application 840. For example, the application 840 may provide information that defines the appearance of a rectangular region containing a set of user interface elements at specified positions and having certain desired interaction capabilities (e.g., selectable, non-selectable, hoverable, non-hoverable, expandable, non-expandable, etc.) associated with specified user interaction types such as, inter alia, single-handed interactions, two-handed interactions, etc. The application 840 may define the type, position, visual appearance, functional characteristics, or other aspects of such elements for use by the input support system 832. The application 840 may provide information to the input support system 832 about its UI elements that defines what information the application 840 will receive. For example, based on defining a button component, the application 840 may receive input events associated with the button when the input support system recognizes user activity (e.g., a pinch and gaze, etc.) as an intentional interaction type with the button element.

In some implementations, the input support system 832 may use information about the positioning of an application user interface and/or the user interface elements within such user interfaces to better understand the user's activity and/or intentions and ultimately to provide a more accurate, more enjoyable, or otherwise better experience for the user. For example, the input support system 832 may use information about the positioning of application user interface and/or the user interface elements within such user interfaces to (a) distinguish user activity associated with a first type of user activity (e.g., a direct interaction mode) from other types of user activity, (b) determine to which user activities to respond to directly and to which user activities the application will respond, and thus selectively provide the application 840 with information limited to the user activities to which the application 840 will itself respond, (c) respond to some user activity associated with the application 840 (e.g., providing hover feedback without needing to notify the application 840), and/or (d) target user activity towards one of multiple applications to which user activity could potentially be intended.

In the example of FIG. 8, the reality system support process 834 provides the input support process 832 with UI geometry (e.g., collision world) data to enable the input support process 832 to better support input to applications and/or other XR environment elements. The reality system support process 834 may generate, update, and/or maintain information about items within a 3D XR environment, e.g., maintaining a current understanding/snapshot view of everything within the environment. This may involve determining where virtual content will be positioned within a XR environment that is based on a user's physical environment. For example, the reality system support process 834 may determine that a first application's UI is to be positioned above the surface of a user's physical desk in an XR environment and a second applications' UI is to be positioned in front of the window to the side of the user's desk.

The reality system support process 834 may determine where to position and how to configure (e.g., by determining container sizes and dimensions) spaces for application UI content to be rendered within a 3D XR environment based on information provided by the applications. In the example of FIG. 8, the application 840 provides UI information (e.g., that may include UI element declarations) that the reality system support process 834 uses to determine where to position and how to configure the spaces for the application's user interface. In one example, configuring the application's UI involves determining a position for one or more containers/colliders (e.g., one or more flat rectangular or other 2D shaped windows or one or more square or other 3D shaped bounding areas) in which the applications' UI will be positioned in 3D space. The reality system support process 834 may position containers for each of one or more applications based on the UI information (e.g., UI declarations) provided by those applications. It may account for surroundings (e.g., the size of the room or other characteristics the XR environment), the user's position, activity, and preferences, and numerous other considerations in determining where and how to organize and manage the 3D positioning of objects within an XR environment. Applications need not know (or be informed about) the positions of their user interfaces within a 3D XR environment.

The reality system support process 834 may determine not only the positions of user interface container/collider features such as windows containing all application content but also other user interface elements with respect to which user interactions and user activity may relate. Such user interface elements include, but are not limited to, text elements, buttons, sliders, scroll bars, pickers (e.g., color pickers), menu controls, timelines, images, vector graphics, rulers, icons, and tabs.

Tracking user interface element positions within the 3D XR environment and providing such information to input support process 832 may enable input support process 832 to more efficiently, accurately, and effectively support input processes including, but not limited to, supporting input to applications such as application 840. Moreover, using such information may additionally enable input support process 832 to do so in a way that protects the privacy of the user by limiting the information about user activity that is exposed to application 840.

For example, the input support process 832 may use hands data from hands system 822 to determine that a user is not currently making a gesture indicative of interaction intent (e.g., hand is not pinching) and use a gaze direction from the gaze system 824 to determine that the user is gazing at a particular button within the user interface of application 840 within the 3D environment maintained by the reality system support process 834. The input support process 832 can use this to initiate an out of process (e.g., outside of the application process) response, e.g., the reality system support process 834 may provide hover feedback highlighting the button to the user. The application 840 need not receive any information about the user's current user activity (e.g., the user's hand state and/or gaze state) and need not even be aware that the hover feedback was provided by the system. In this example, the input support process 832 uses the UI geometry information provided by the reality system support 834 and based on UI information provided by the application 840 to provide a response on to user activity on behalf of the application 840 without the application needed to itself be involved. Avoiding providing user activity data about some types of user activity (e.g., unintentional activity) can help protect user private data from application 840.

In another example, the input support process 832 may use hands data from hands system 822 to determine that a user is not currently making a gesture indicative of interaction intent (e.g., hand is not pinching) and use a gaze direction from the gaze system 824 to determine that the user is gazing at a menu heading within the user interface of application 840 within the 3D environment maintained by the reality system support process 834. The input support process 832 can use this to initiate an out of process (e.g., outside of the application process) response, e.g., the reality system support process 834 may provide an expansion of the menu showing previously hidden menu options to the user. The application 840 need not receive any information about the user's current user activity (e.g., the user's hand state and/or gaze state) and need not even be aware that the menu was expanded. In this example, the input support process 832 uses the UI geometry information (e.g., identifying the menu and its menu options and their positions within 3D space) provided by the reality system support 834 and based on UI information provided by the application 840 to provide a response on to user activity on behalf of the application 840 without the application needed to itself be involved. Avoiding providing user activity data about some types of user activity (e.g., unintentional activity) can help protect user private data from application 840.

The input support process 832 may additionally (or alternatively) use the UI geometry information (provided by the reality system support 834 and based on UI information provided by the application 840) to provide information to the application 840 to respond itself to user activity. In some implementations, such information is limited to only user activity associated with a first type of user activity, e.g., user activity associated with an intentional interaction with a user interface element. The input support process 832 may provide information (e.g., interaction data) to enable the application 840 to respond to user activity itself. Such information may process or limit the user activity data (e.g., the hands/gaze data received from the XR system 820) such that the application 840 does not obtain detailed user data, e.g., data about specific user gaze directions, user hand size/shape, etc.

For example, the input support process 832 may use hands data from hands system 822 to determine that a user is currently making a gesture indicative of interaction intent (e.g., hand is pinching) and use a gaze direction from the gaze system 824 to determine that the user is gazing at a particular button within the user interface of application 840 within the 3D environment maintained by the reality system support process 834. Based on determining that this user activity (e.g., pinch and gaze) satisfies criteria to qualify as a first type of user activity (e.g., an intentional interaction with a UI element), the input support process 832 can generate data (e.g., interaction data) that is different than the raw hands and raw gaze data to send to the application 840 to enable the application 840 to respond to the user activity itself. The application 840 need not receive the raw hands data and/or the raw gaze data associated with the user's current activity and need not even be aware that the user activity was gaze/hands-based. Rather, the data provided to the application 840 may simply be sufficient for the application 840 to recognize an input event (e.g., a hit event) to the button of the user interface of the application 840. Such data may have been abstracted to use input modality agnostic format or a single input modality format that may differ from the input modalities available on the device (e.g., using a touch-screen input modality format). Avoiding providing detailed user activity (e.g., detailed hands or gaze data) can help protect user private data from application 840.

The data provided to application 840 that enables the application 840 to respond to input to its UI elements can have various forms. In some implementations, such data is limited to only certain types of user activity and thus the data format reflects this, e.g., the application 840 may be provided with data defining an interaction event in circumstances in which the application is to be provided data to respond to intentional UI interaction events. In one example, an application 840 is only provided information identifying a UI element that was interacted with and the type of event, e.g., button X received a hit type interaction.

In other implementations, an application 840 has an input recognition framework for a particular input environment (e.g., a 2D input environment) and the data provided to the application 840 mimics the format of that input environment. For example, an application 840 may be configured with a 2D input recognition framework in which the application 840 is configured to recognize 2D touch input on a touch screen device, e.g., receiving interaction pose data identifying touch points and directions for user touches to a touch screen interface. Note that the term "pose" here refers to such information identifying a 2D position on a touch screen and/or a direction associated with the touch—it may involve receiving only 2D position or it may involve receiving 2D position and directional data. In this example, such an application 840 with a 2D input recognition framework may be provided with data that mimics a touch event. For example, the input support process 832 may use hands data from hands system 822 to determine that a user is currently making a gesture indicative of interaction intent (e.g., hand is pinching) and use a gaze direction from the gaze system 824 to determine that the user is gazing at a particular button within the user interface of application 840 within the 3D environment maintained by the reality system support process 834. The input support process 832 may generate interaction data that identifies the 2D position of the gaze direction relative to the application's user interface element and provides this as an interaction pose to the application 840 so that the application 840 can interpret this as a touch event (e.g., a tap) at that position (on the button) and initiate an appropriate response. The application 840 need only receive the interaction pose without needing to receive the raw hands or gaze data. In this example, the application 840 knows the point of interaction (in its 2D space) but does not know (and does not need to know for input recognition purposes) the gaze direction in the 3D space of the XR environment.

In some implementations, the use of input support process 832 enables execution of application 840 in an environment different than its original or intended environment. For example, the application 840 may be originally compiled or intended for execution on a mobile device having a 2D touch screen input environment or a laptop having a 2D mouse/trackpad driven environment. The application 840 may be executed within a device that offers 3D input modalities and receive data from the input support process 832 (corresponding to those 3D input modalities that the application 840 cannot directly recognize) in a format that the application 840 can recognize, e.g., as a 2D input corresponding to touch screen or mouse/trackpad-driven input. An application intended for a mobile device, laptop, or other device may be executed within an HMD environment that enables 3D interactions without needing to make significant (or any) modifications to the input recognition processes of the application. In one example, an HMD is configured with binary compatibility to mobile and/or laptop devices, e.g., made capable of executing the binary or object code executable of mobile and/or laptop devices) and provides enhanced input capabilities to mobile and/or laptop applications executing on the HMD by utilizing an input support process 832 that provides data based on user activity in a 3D environment that the applications can recognize as 2D modality-based input.

In the above example, the application 840 may be provided with additional information. For example, the application 840 may receive information about the location of the pinching hand, e.g., a manipulator pose. Such hand information may be higher level than the raw hands data. For example, the application 840 may receive a manipulator pose that identifies the position and/or orientation of the hand within 3D space without receiving information about the hand's configuration and/or information about a 3D model (e.g., of joints) used to represent the hand's positions, pose, and/or configuration in 3D space. In another example, the application 840 may receive information about an interaction state, e.g., identifying a type of interaction or gesture, such as one-handed or two-handed, as determined by the input support process 832.

In the above example, the criteria for identifying a first type of user activity (e.g., activity associated with intentional user element interaction) involves assessing whether the user's hand exhibited a particular configuration (e.g., a pinch gesture) and, based on identifying the hand exhibiting such a configuration, identifying other concurrent user activity, e.g., identifying where the user is gazing at (or near) that time. Such a pinch may be determined based on criteria that assesses the proximity of portions of a user hand model to one another (e.g., how close is the fingertip to the thumb tip, etc.), using a classifier or other algorithm to label or classify a user hand configuration, or otherwise by processing the hands data. Other types of user activity and/or criteria may be used to identify a first type of user activity (e.g., activity associated with intentional user element interaction). For example, a voice command may be recognized as an indicator of intentional activity, e.g., recognizing a key word or phrase such as "select" or "hit" or "tap" or "click this" and then associating a gaze direction and/or other user activity occurring during or near the time of the utterance of the key word or phrase with the intention to interact, e.g., using the other activity to identify the UI element target upon which the action will be taken.

The input support process 832 may additionally account for sensor-based or other inaccuracies in the hands and/or gaze data. Tracking user application interface element positions within the 3D XR environment and providing such information to input support process 832 may enable it to account for such inaccuracies. Moreover, it may be desirable to a use a system (shared) process so that such inaccuracies can be accounted for consistently and effectively across multiple applications. In other words, it may be desirable to have a single shared process performing such corrections rather than having individual applications doing so. In one example, a user gazes at a button but the gaze system 824 generates a user's gaze direction that is slightly outside of the button (e.g., 0.5 degrees outside). The input support process 832 may correct for this error. For example, it may determine that the gaze was likely actually directed at the button since it is within a threshold (e.g., 1 degree) of the button and there is nothing else nearby. The input support process 832 may correct for this in providing the data to the application 840 that enables the application to respond to the user activity. For example, rather than providing an interaction pose slightly outside of the button, it may provide an interaction pose that is within the button, e.g., at the button's edge. The application 840 thus need not account for the gaze inaccuracy in its own input recognition processes, e.g., it need not itself determine whether an interaction pose just outside of the button should be considered a within the button. This may be particularly useful if the application 840 uses a framework from another input paradigm, e.g., a touch screen paradigm that utilizes different (potentially much smaller) inaccuracy/error thresholds. Such an application would not have to implement different thresholds for different inaccuracy levels expected in different input modalities. Having the input support process (e.g., an OS process) correct for such inaccuracies may provide more consistent and accurate results without requiring that application developers devote extensive resources to addressing such inaccuracies and/or differences amongst different input modalities.

The application 840 may provide UI information to the operating system process 830 in various formats. In some implementations, the application 840 declares its UI elements, e.g., declaring a hierarchy of UI elements within its user interface. Such declarations may include information/instructions that enable the operating system process 830 to respond to some user activity on the application's behalf. In some implementations, the application 840 declares remote effects for certain UI elements, e.g., declaring that button X should show hover feedback but that button Y should not show hover feedback. An application 840 may use remote effect declarations to specify the behavior that the application 840 intends for some or all of its UI elements. The application may provide a hierarchical declaration structure (e.g., an Apple® Core Animations® (CA) structure) that declares UI element positions, sizes, types, hierarchical relationships, transparent portions, layering effects, special effects, and/or any other information that facilitates the functions provided by the reality system support process 834 and/or the input support process 832. The application 840 may provide such information over an inter-process communication (or otherwise) to the operating system process 830.

The input support process 832 may use such information (e.g., application declarations of UI elements and/or remote effects) to better interpret user activity or gestures. For example, a given gaze may be between two UI elements, one having remote effects and the other not having remote effects, and the input support process 832 may move/snap the gaze to the UI element that has the remote effects since it is more likely to be the appropriate/intended UI element to which a UI response should be associated. Remote effects may be performed out of process without application 840 being involved.

In some implementations, application 840 is enabled to request user permission for specified user data (e.g., detailed hands and/or detailed gaze data) and, if explicitly approved by the user, enabled to receive such information.

In various implementations, hands system 822 may produce different types of data including, but not limited to, timestamp data, joint position data, POV corrections (e.g., to joint positions), world transform data, joint confidence data, palm center data, palm normal direction data, hand action data, hand radius data, pinch data, object detection data (e.g., regarding an object held or touching the hand), and occlusion data, e.g., occlusion probability data regarding one joint being occluded and thus its data potentially less accurate. Similarly, in various implementations, the gaze system 826 may produce different types of data including, but not limited to, timestamp data, world transform data, binocular gaze data, gaze confidence data, gaze tracking state data, gaze direction data, gaze origin data, pupil center data, and pupil diameter data. In some implementations, the XR system includes a frame support module that enables better frame drop support via input frame queuing.

Input support process 832 may have access to rich and detailed hands data and gaze data and use that rich and detailed information to support accurate, efficient, and consistent input responses both within app processes and outside of app processes. However, it may be desirable to keep the details of such rich and detailed user data outside of applications, such as application 840, for example, to prevent such applications from knowing information about the user that the user considers private, e.g., what the user reads, which content they look at and for how long, how quickly the user reads, how big the user's hands/fingers are, how the user interacts with other applications or aspects of the XR environment, etc.

Application 840 comprises UI frameworks 842 for enabling gesture recognition such as determining to associate actions performed by hands of a user with a direct interaction mode and/or an indirect interaction mode. Gesture recognition may be based on interpreting hand positions and/or hand movements via usage of sensor data such as, inter alia, image data captured by inward or outward facing cameras or sensors on an HMD.

Application 840 is configured to allow a user to initiate an interaction associated with a visual object of a UI with a first hand while viewing a differing visual object of the UI such that the first hand of the user operates in a direct interaction mode and a second hand of the user operates in an indirect interaction mode. A direct interaction mode may include, for example, a user moving a first hand with respect to a displayed UI to make contact with a user interface control as described with respect to FIG. 7A, supra. An indirect interaction mode may include, for example, the user gazing at a user interface and providing a hand gesture causing an interaction based on the gaze as described with respect to FIG. 7C, supra. For example, the user may gaze at a virtual UI button and simultaneously perform a pinch gesture to provide a selection input to the virtual UI button. Accordingly, the user may use one hand to perform direct interactions while simultaneously using the other hand and a gaze to provide indirect interactions.

Application 840 may be further configured to automatically determine an interaction mode (e.g., a direct or indirect interaction mode associated with one or two hands of a user) in response to predicting user intent with respect to user hand and/or body motion and/or specified context.

Application 840 may comprise an algorithm or machine learning model to associate user actions with a dual modality mode such as a direct interaction mode for one hand and an indirect interaction mode for the other hand. Feedback indicating which hand is currently operating in which mode may be provided. For example, it may be determined which hand a gaze function or interaction is associated with.

Application 840 may be further configured map interaction mode functionalities to specified hands (e.g., left or right) of a user. For example, a left hand may be designated as being associated with direct interactions when operating in a dual interaction mode. Likewise, a right hand may be designated as being associated with indirect interactions when operating in a dual interaction mode. Additionally, a gaze interaction may be associated with a specified hand such as a right hand or a left hand. For example, a user may prefer to use right hand for indirect interactions. In some implementations, a first hand may be associated with first specified types/modes of interactions and a second hand may be associated with second and differing types/modes of interactions.

Figure 9A:
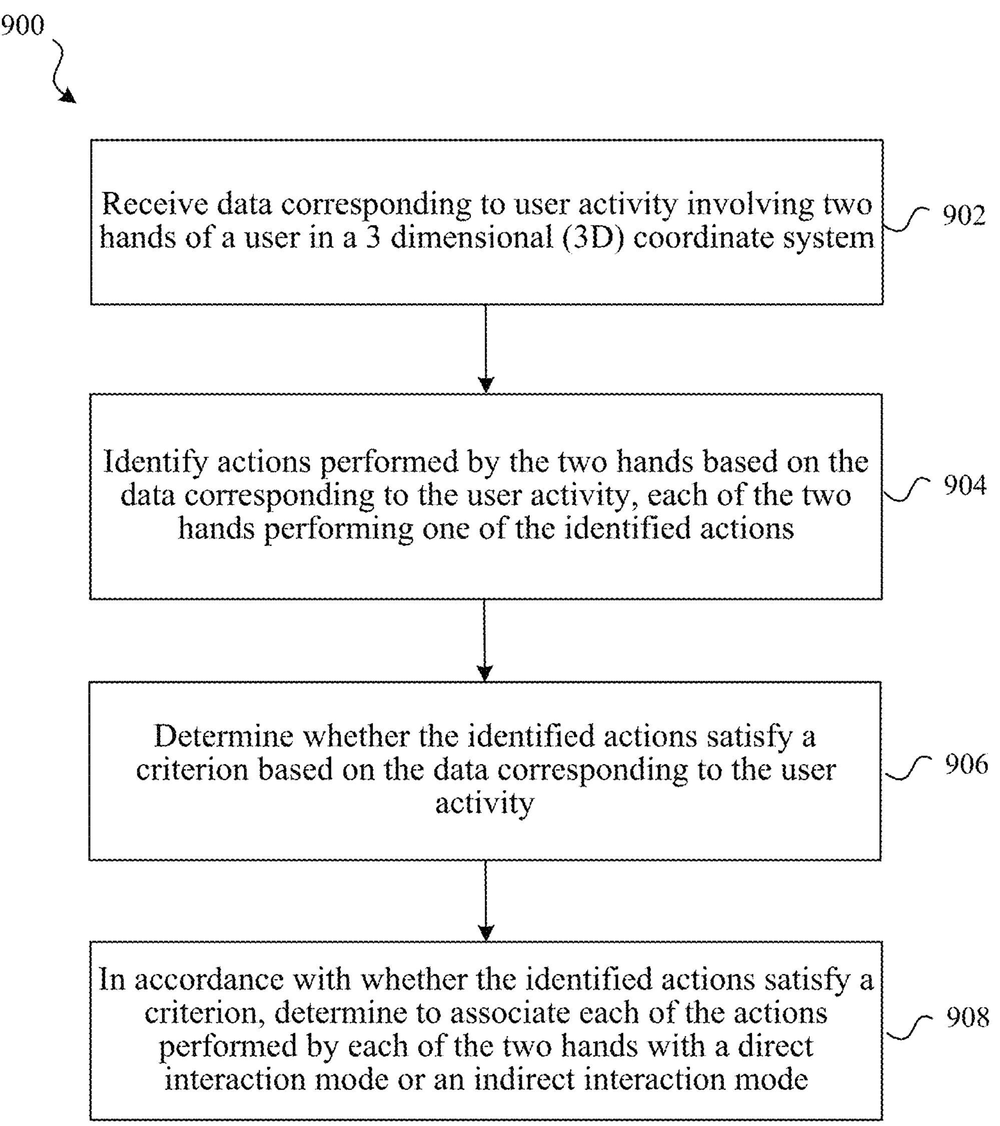
FIG. 9A is a flowchart representation of an exemplary method that associates actions performed by two hands of a user with a direct interaction mode or an indirect interaction mode, in accordance with some implementations.

FIG. 9A is a flowchart representation of an exemplary method 900 that associates actions performed by two hands of a user with a direct interaction mode or an indirect interaction mode, in accordance with some implementations. In some implementations, the method 900 is performed by a device, such as a mobile device, desktop, laptop, HMD, or server device. In some implementations, the device has a screen for displaying images and/or a screen for viewing stereoscopic images such as a head-mounted display (HMD such as e.g., device 105 of FIG. 1). In some implementations, the method 900 is performed by processing logic, including hardware, firmware, software, or a combination thereof. In some implementations, the method 900 is performed by a processor executing code stored in a non-transitory computer-readable medium (e.g., a memory). Each of the blocks in the method 900 may be enabled and executed in any order.

At block 902, the method 900 receives data corresponding to user activity involving two hands of a user in a 3D coordinate system. For example, data corresponding to user activity may include hands data 610, gaze data 620, and UI target data 630 as described with respect to FIG. 6. Hands data may include, inter alia, hand model data, such as skeleton representation(s), representing the 3D configurations, 3D positions, and 3D movements of a user's hands as determined based on sensor data such as outward facing image/depth sensor data.

At block 904, the method 900 identifies actions performed by the two hands based on the data corresponding to the user. Actions performed by the two hands may include hand or finger movements as described, for example, with respect to FIGS. 1A, 1B, and 8. Each hand may perform at least one of the identified actions.

At block 906, the method 900 determines whether the identified actions satisfy a criterion based on the data corresponding to the user activity. A criterion may include, for example, deliberate or intentional actions indicative of an intention to interact with (e.g., select, activate, move, etc.) a user interface element as described with respect to FIG. 8.

At block 908, in accordance with whether the identified actions satisfy a criterion, each of the actions performed by each of the two hands is associated with a direct interaction mode or an indirect interaction mode. For example, assessing whether a user's hand exhibited a particular configuration such as a pinch gesture as described with respect to FIG. 8.

In some implementations, a response to the user activity may be initiated in response to determining whether each of the actions performed by each of the two hands is associated with the direct interaction mode or the indirect interaction mode. For example, information may be provided to an application to enable the application to provide the response.

In some implementations, a UI element within the 3D coordinate system may be identified to associate with the user activity. For example, a UI element may be identified based on determining where the user is gazing. Likewise, the UI element may be a collider corresponding to a 3D virtual object or a flat/2D UI element of an application defined by layer trees, etc. positioned within the 3D coordinate system by a shared simulation system. In some implementations, a response to the user activity may be initiated based on the identified UI element and whether each of the actions performed by each of the two hand is associated with the direct interaction mode or the indirect interaction mode as described with respect to FIGS. 4, 5, and 7A-7C.

In some implementations, the direct interaction mode may include using at least a portion of at least one of the two hands to directly enable a functional component displayed within an XR environment.

In some implementations, the indirect interaction mode comprises initially using a gaze direction to select a functional component displayed within an XR environment and subsequently use at least a portion of at least one of the two hands to directly enable the functional component. For example, virtually enabling (e.g., press) a displayed button as described with respect to FIGS. 7A-7C.

In some implementations, the direct interaction or the indirect interaction mode is associated with each of the two hands.

In some implementations, the direct interaction mode is associated with a first hand of the two hands and the indirect interaction mode is associated with a second hand of the two hands.

In some implementations, the direct interaction mode or the indirect interaction mode is determined in response to predicting user intent based on user motion.

In some implementations, the direct interaction mode or the indirect interaction mode is determined in response to predicting user intent based on user context.

In some implementations, the direct interaction mode or the indirect interaction mode is determined in response to predicting user intent based on UI element positioning with respect to user gaze.

In some implementations, feedback indicating a direct interaction mode status and an indirect interaction mode status associated with each of the two hands may be provided.

Figure 9B:
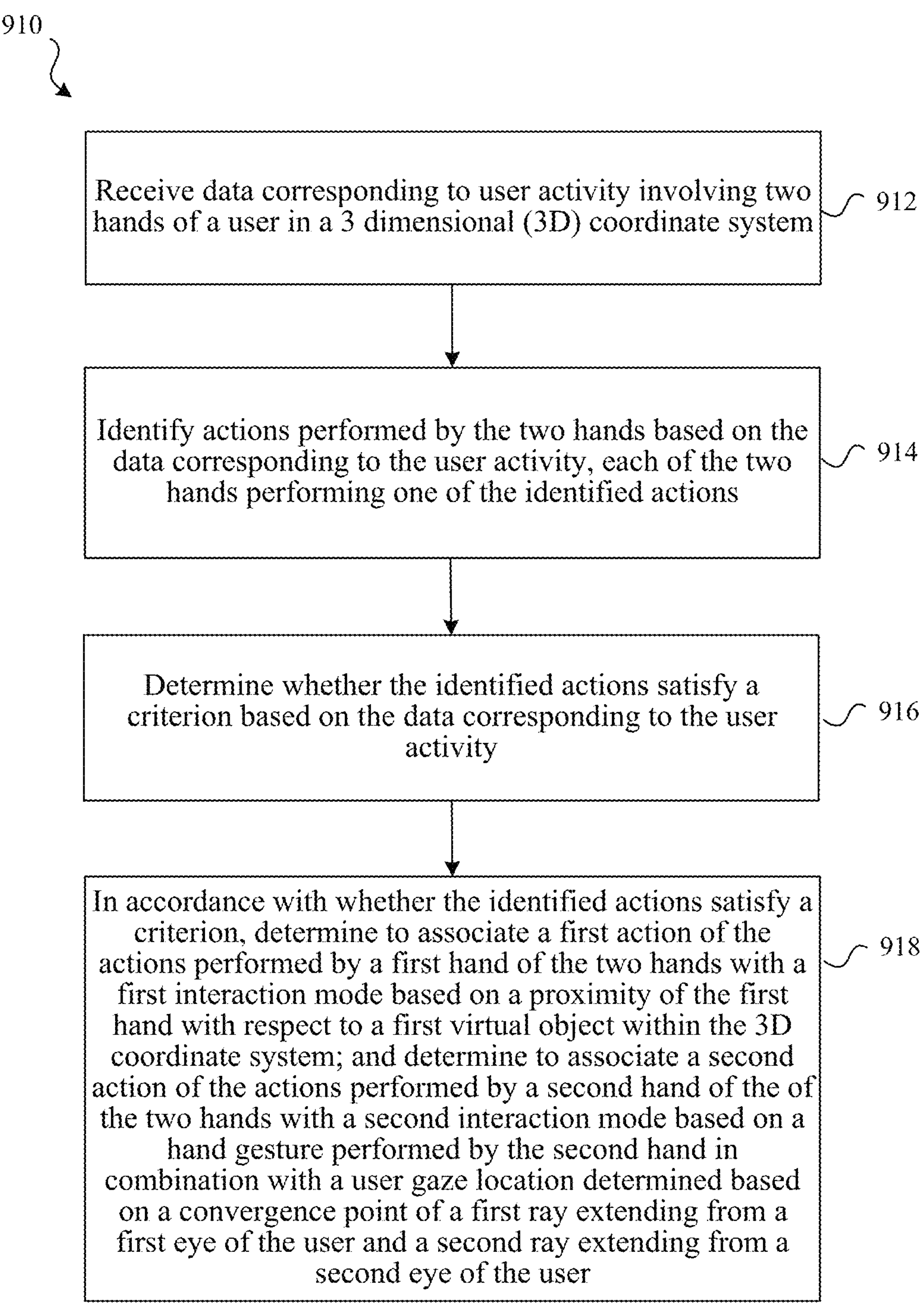
FIG. 9B is a flowchart representation of an exemplary method that associates actions performed by two hands of a user with a first interaction mode and a second interaction mode, in accordance with some implementations.

FIG. 9B is a flowchart representation of an exemplary method 910 that associates actions performed by two hands of a user with a first interaction mode and a second interaction mode, in accordance with some implementations. In some implementations, the method 910 is performed by a device, such as a mobile device, desktop, laptop, HMD, or server device. In some implementations, the device has a screen for displaying images and/or a screen for viewing stereoscopic images such as a head-mounted display (HMD such as e.g., device 105 of FIG. 1). In some implementations, the method 910 is performed by processing logic, including hardware, firmware, software, or a combination thereof. In some implementations, the method 910 is performed by a processor executing code stored in a non-transitory computer-readable medium (e.g., a memory). Each of the blocks in the method 910 may be enabled and executed in any order.

At block 912, the method 910 receives data corresponding to user activity involving two hands of a user in a 3D coordinate system. For example, data corresponding to user activity may include hands data 610, gaze data 620, and UI target data 630 as described with respect to FIG. 6. Hands data may include, inter alia, hand model data, such as skeleton representation(s), representing the 3D configurations, 3D positions, and 3D movements of a user's hands as determined based on sensor data such as outward facing image/depth sensor data.

At block 914, the method 910 identifies actions performed by the two hands based on the data corresponding to the user. Actions performed by the two hands may include hand or finger movements as described, for example, with respect to FIGS. 1A, 1B, and 8. Each hand may perform at least one of the identified actions.

At block 916, the method 910 determines whether the identified actions satisfy a criterion based on the data corresponding to the user activity. A criterion may include, for example, deliberate or intentional actions indicative of an intention to interact with (e.g., select, activate, move, etc.) a user interface element as described with respect to FIG. 8.

At block 918, in accordance with whether the identified actions satisfy a criterion, it may be determined to associate a first action of the actions performed by a first hand of the two hands with a first interaction mode based on a proximity of the first hand with respect to a first virtual object within the 3D coordinate system. Likewise, it may be determined to associate a second action of the actions performed by a second hand of the of the two hands with a second interaction mode based on a hand gesture performed by the second hand in combination with a user gaze location determined based on a convergence point of a first ray extending from a first eye of the user and a second ray extending from a second eye of the user. For example, assessing whether each user's hand exhibited a particular configuration such as a touch gesture, pinch gesture, a gaze gesture, etc. as described with respect to FIG. 8.

In some implementations, a response to the user activity may be initiated in response to determining whether each of the actions performed by each of the two hands is associated with the first interaction mode or the second interaction mode. For example, information may be provided to an application to enable the application to provide the response.

In some implementations, the first virtual object may be a collider corresponding to a 3D virtual object or a flat/2D UI element of an application defined by layer trees, etc. positioned within the 3D coordinate system by a shared simulation system. In some implementations, the first interaction mode or the second interaction mode is determined in response to predicting user intent based on user motion.

In some implementations, the first interaction mode or the second interaction mode is determined in response to predicting user intent based on user context.

In some implementations, the first interaction mode or the second interaction mode is determined in response to predicting user intent based on UI element positioning with respect to user gaze.

Figure 10:
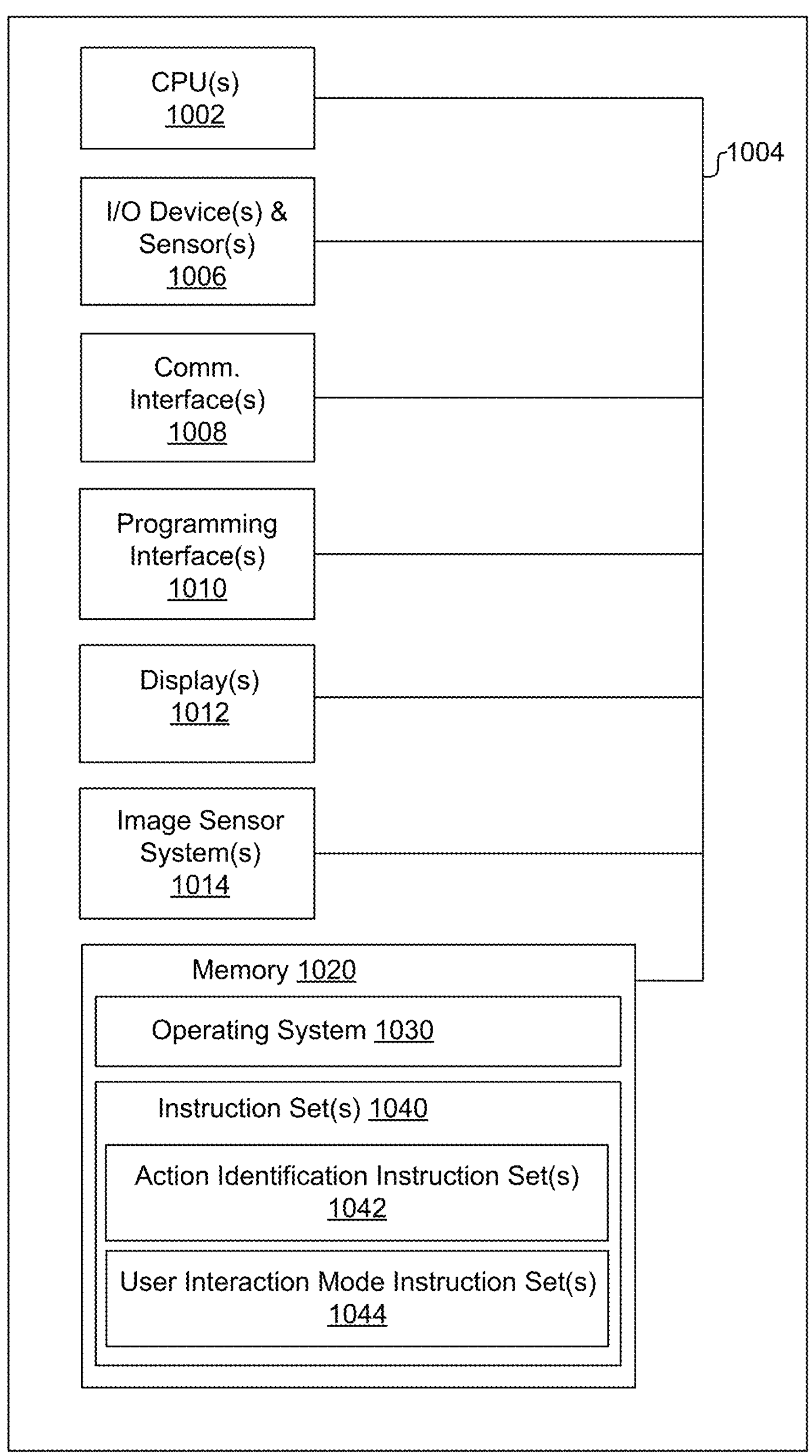
FIG. 10 is a block diagram of an electronic device of in accordance with some implementations.

FIG. 10 is a block diagram of a device 1000. Device 1000 illustrates an exemplary device configuration for electronic device 105 or 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1000 includes one or more processing units 1002 (e.g., microprocessors, ASICs, FPGAs, GPUs, CPUs, processing cores, and/or the like), one or more input/output (I/O) devices and sensors 1006, one or more communication interfaces 1008 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1010, one or more output device(s) 1012, one or more interior and/or exterior facing image sensor systems 1014, a memory 1020, and one or more communication buses 1004 for interconnecting these and various other components.

In some implementations, the one or more communication buses 1004 include circuitry that interconnects and controls communications between system components. In some implementations, the one or more I/O devices and sensors 1006 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1012 include one or more displays configured to present a view of a 3D environment to the user. In some implementations, the one or more displays 1012 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1000 includes a single display. In another example, the device 1000 includes a display for each eye of the user.

In some implementations, the one or more output device(s) 1012 include one or more audio producing devices. In some implementations, the one or more output device(s) 1012 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1012 may additionally or alternatively be configured to generate haptics.

In some implementations, the one or more image sensor systems 1014 are configured to obtain image data that corresponds to at least a portion of a physical environment. For example, the one or more image sensor systems 1014 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1014 further include illumination sources that emit light, such as a flash. In various implementations, the one or more image sensor systems 1014 further include an on-camera image signal processor (ISP) configured to execute a plurality of processing operations on the image data.

The memory 1020 includes high-speed random-access memory, such as DRAM, SRAM, DDR RAM, or other random-access solid-state memory devices. In some implementations, the memory 1020 includes non-volatile memory, such as one or more magnetic disk storage devices, optical disk storage devices, flash memory devices, or other non-volatile solid-state storage devices. The memory 1020 optionally includes one or more storage devices remotely located from the one or more processing units 1002. The memory 1020 comprises a non-transitory computer readable storage medium.

In some implementations, the memory 1020 or the non-transitory computer readable storage medium of the memory 1020 stores an optional operating system 1030 and one or more instruction set(s) 1040. The operating system 1030 includes procedures for handling various basic system services and for performing hardware dependent tasks. In some implementations, the instruction set(s) 1040 include executable software defined by binary information stored in the form of electrical charge. In some implementations, the instruction set(s) 1040 are software that is executable by the one or more processing units 1002 to carry out one or more of the techniques described herein.

The instruction set(s) 1040 includes an action identification instruction set 1042 and a user interaction mode instruction set 1044. The instruction set(s) 1040 may be embodied as a single software executable or multiple software executables.

The action identification instruction set 1042 is configured with instructions executable by a processor to enable identification of actions performed by two hands of a user based on data corresponding to user activity.

The user interaction mode instruction set 1044 is configured with instructions executable by a processor to determine whether to associate each of the actions performed by each of the two hands of the user with a direct interaction mode or an indirect interaction mode.

Although the instruction set(s) 1040 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:

at a device having a processor and one or more sensors:

receiving data corresponding to user activity involving two hands of a user in a 3D coordinate system;

identifying actions performed by the two hands based on the data corresponding to the user activity, each of the two hands performing one of the identified actions; and in accordance with a determination that the identified actions satisfy a criterion based on the data corresponding to the user activity, associating a first action of the actions performed by a first hand of the two hands with a first interaction mode based on a proximity of the first hand with respect to a first virtual object within the 3D coordinate system, wherein the first hand of the user directly interacts with the first virtual object in the first interaction mode; and associating a second action of the actions performed by a second hand of the of the two hands with a second interaction mode based on a hand gesture performed by the second hand in combination with a user gaze location determined based on a convergence point of a first ray extending from a first eye of the user and a second ray extending from a second eye of the user, wherein the second hand of the user in combination with the user gaze location indirectly interacts with a second virtual object in the second interaction mode, wherein the first virtual object differs from the second virtual object, and wherein the first interaction mode occurs during a same time period as the second interaction mode.

2. The method of claim 1 further comprising initiating a response to the user activity based on the first interaction mode and the second interaction mode.

3. The method of claim 1, wherein the first virtual object is a collider corresponding to a 3D virtual object.

4. The method of claim 1, wherein the first virtual object is a 2 dimensional (2D) UI element of an application positioned within the 3D coordinate system by a shared simulation system.

5. The method of claim 1, wherein the first interaction mode or the second interaction mode is determined in response to predicting user intent based on user motion.

6. The method of claim 1, wherein the first interaction mode or the second interaction mode is determined in response to predicting user intent based on user context.

7. The method of claim 1, wherein the first interaction mode or the second interaction mode is determined in response to predicting user intent based on UI element positioning with respect to user gaze.

8. The method of claim 1, further comprising:

providing feedback indicating a direct interaction mode status and an indirect interaction mode status associated with each of the two hands.

9. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

receiving data corresponding to user activity involving two hands of a user in a 3D coordinate system;

identifying actions performed by the two hands based on the data corresponding to the user activity, each of the two hands performing one of the identified actions; and in accordance with a determination that the identified actions satisfy a criterion based on the data corresponding to the user activity, associating a first action of the actions performed by a first hand of the two hands with a first interaction mode based on a proximity of the first hand with respect to a first virtual object within the 3D coordinate system, wherein the first hand of the user directly interacts with the first virtual object in the first interaction mode; and associating a second action of the actions performed by a second hand of the of the two hands with a second interaction mode based on a hand gesture performed by the second hand in combination with a user gaze location determined based on a convergence point of a first ray extending from a first eye of the user and a second ray extending from a second eye of the user, wherein the second hand of the user in combination with the user gaze location indirectly interacts with a second virtual object in the second interaction mode, wherein the first virtual object differs from the second virtual object, and wherein the first interaction mode occurs during a same time period as the second interaction mode.

10. The system of claim 9, wherein the operations further comprise initiating a response to the user activity based on the first interaction mode and the second interaction mode.

11. The system of claim 9, wherein the first virtual object is a collider corresponding to a 3D virtual object.

12. The system of claim 9, wherein the first virtual object is a 2 dimensional (2D) UI element of an application positioned within the 3D coordinate system by a shared simulation system.

13. The system of claim 9, wherein the first interaction mode or the second interaction mode is determined in response to predicting user intent based on user motion.

14. The system of claim 9, wherein the first interaction mode or the second interaction mode is determined in response to predicting user intent based on user context.

15. The system of claim 9, wherein the first interaction mode or the second interaction mode is determined in response to predicting user intent based on UI element positioning with respect to user gaze.

16. The system of claim 9, further comprising:

providing feedback indicating a direct interaction mode status and an indirect interaction mode status associated with each of the two hands.

17. A non-transitory computer-readable storage medium storing program instructions executable via one or more processors to perform operations comprising:

receiving data corresponding to user activity involving two hands of a user in a 3D coordinate system;

identifying actions performed by the two hands based on the data corresponding to the user activity, each of the two hands performing one of the identified actions; and in accordance with a determination that the identified actions satisfy a criterion based on the data corresponding to the user activity, associating a first action of the actions performed by a first hand of the two hands with a first interaction mode based on a proximity of the first hand with respect to a first virtual object within the 3D coordinate system, wherein the first hand of the user directly interacts with the first virtual object in the first interaction mode; and associating a second action of the actions performed by a second hand of the of the two hands with a second interaction mode based on a hand gesture performed by the second hand in combination with a user gaze location determined based on a convergence point of a first ray extending from a first eye of the user and a second ray extending from a second eye of the user, wherein the second hand of the user in combination with the user gaze location indirectly interacts with a second virtual object in the second interaction mode, wherein the first virtual object differs from the second virtual object, and wherein the first interaction mode occurs during a same time period as the second interaction mode.

18. The non-transitory computer-readable storage medium of claim 17, wherein the operations further comprise initiating a response to the user activity based on the first interaction mode and the second interaction mode.

* * * * *